(12) United States Patent
Maeda

(10) Patent No.: US 11,928,369 B2
(45) Date of Patent: Mar. 12, 2024

(54) INFORMATION PROCESSING APPARATUS, CONTROL METHOD, AND PROGRAM PRODUCT THAT BATCH SETS A GROUP OF SET VALUES CORRESPONDING TO A SELECTED USE ENVIRONMENT

(71) Applicant: CANON KABUSHIKI KAISHA, Tokyo (JP)

(72) Inventor: Takumi Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,236

(22) Filed: Jun. 6, 2023

(65) Prior Publication Data
US 2023/0401013 A1    Dec. 14, 2023

(30) Foreign Application Priority Data
Jun. 9, 2022    (JP) .................................. 2022-093566

(51) Int. Cl.
*G06F 3/12*    (2006.01)

(52) U.S. Cl.
CPC .......... *G06F 3/1205* (2013.01); *G06F 3/1222* (2013.01); *G06F 3/1238* (2013.01); *G06F 3/1285* (2013.01)

(58) Field of Classification Search
CPC .... G06F 3/1205; G06F 3/1222; G06F 3/1238; G06F 3/1285
See application file for complete search history.

(56) References Cited

U.S. PATENT DOCUMENTS

| 8,649,041 B2* | 2/2014 | Hamaguchi .......... | G03G 15/502 |
| | | | 358/1.14 |
| 2023/0176793 A1* | 6/2023 | Kimura ................. | G06F 3/1222 |
| | | | 358/1.13 |
| 2023/0179636 A1* | 6/2023 | Kimura .............. | H04N 1/00244 |
| | | | 726/6 |
| 2023/0231887 A1* | 7/2023 | Ito ......................... | G06F 3/1222 |
| | | | 358/1.14 |
| 2023/0254420 A1* | 8/2023 | Ito ...................... | H04N 1/00244 |
| | | | 358/1.15 |
| 2023/0283721 A1* | 9/2023 | Kimura .............. | H04N 1/00074 |
| | | | 358/1.9 |

FOREIGN PATENT DOCUMENTS

JP    2007185814 A    7/2007

* cited by examiner

*Primary Examiner* — Scott A Rogers
(74) *Attorney, Agent, or Firm* — Canon U.S.A., Inc. IP Division

(57) ABSTRACT

An information processing apparatus having a plurality of functions includes: an accepting unit configured to accept selection of one environment from among a plurality of different environments as a use environment of the information processing apparatus; a first notification unit configured to provide a notification of a function which is at least one of the plurality of functions and for which a change in use occurs when a group of set values corresponding to the selected one environment is set in the information processing apparatus; a second notification unit configured to extract a set value related to the change in use from the group of set values and provide a notification of the set value; and a setting unit configured to perform batch setting for the information processing apparatus on the basis of the group of set values in response to an instruction for setting the group of set values.

13 Claims, 15 Drawing Sheets

INFORMATION PROCESSING APPARATUS, CONTROL METHOD, AND PROGRAM PRODUCT THAT BATCH SETS A GROUP OF SET VALUES CORRESPONDING TO A SELECTED USE ENVIRONMENT

BACKGROUND OF THE DISCLOSURE

Field of the Disclosure

The present disclosure relates to an information processing apparatus that sets a plurality of setting items by batch.

Description of the Related Art

In general, information processing apparatuses have a setting function of setting various settings on the basis of user operations. Information processing apparatuses have been installed in various environments, such as at home for teleworking and in public spaces shared by a large number of unspecified persons, and settings required for the image forming apparatuses have become complicated. Japanese Patent Laid-Open No. 2007-185814 discloses a technique for, when a user specifies a graded security level, setting security-related functions of an image forming apparatus by batch in accordance with the security level.

However, when security-related settings are set automatically by batch in response to selection of, for example, a security level or a use environment, the user might not be able to know changes that may occur in future use of the information processing apparatus. For example, the user might not be able to recognize that batch setting results in a security measure being relaxed or a security measure being enabled and a function being consequently restricted.

SUMMARY OF THE DISCLOSURE

The present disclosure provides a technique for, when batch setting is performed in response to selection of an item associated with a use environment and at least one set value is to be changed consequently, providing a notification based on the change in the set value.

An information processing apparatus according to an aspect of the present disclosure is an information processing apparatus having a plurality of functions, the information processing apparatus including: an accepting unit configured to accept selection of one environment from among a plurality of different environments as a use environment of the information processing apparatus; a first notification unit configured to provide a notification of a function which is at least one of the plurality of functions and for which a change in use occurs when a group of set values corresponding to the selected one environment is set in the information processing apparatus; a second notification unit configured to extract a set value related to the change in use from the group of set values and provide a notification of the set value; and a setting unit configured to perform batch setting for the information processing apparatus on the basis of the group of set values in response to an instruction for setting the group of set values.

Further features of the present disclosure will become apparent from the following description of exemplary embodiments with reference to the attached drawings.

DESCRIPTION OF THE EMBODIMENTS

Hereinafter, embodiments of the present disclosure will be described with reference to the drawings. Note that the following embodiments are not intended to limit the present disclosure according to the scope of the claims, and all of the combinations of features described in the embodiments are not essential to the present disclosure.

First Embodiment

Figure 1:
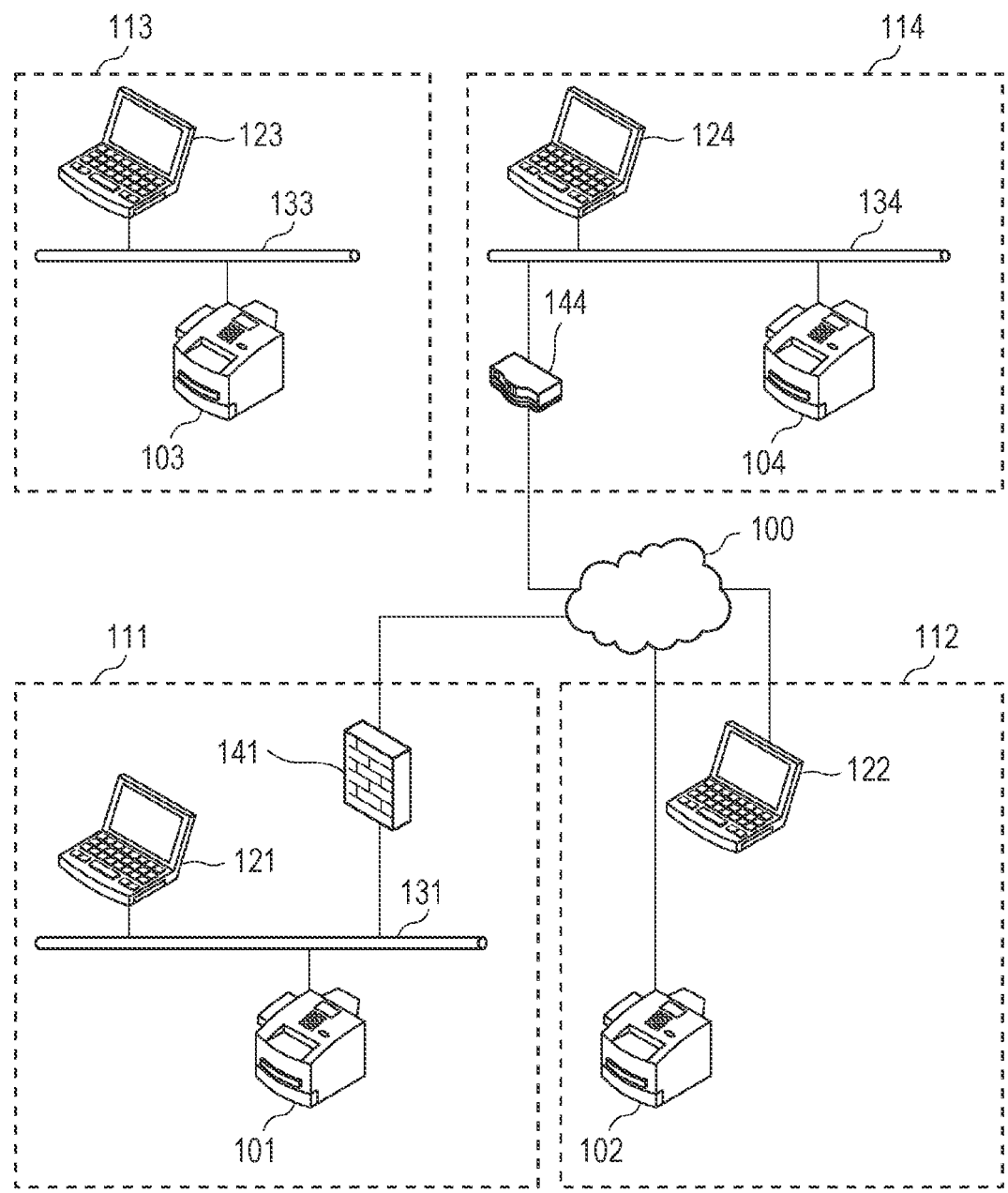
FIG. 1 is a diagram illustrating the use environments of information processing apparatuses.

FIG. 1 is a configuration diagram illustrating the use environments of information processing apparatuses in this embodiment.

Image forming apparatuses 101 to 104 are examples of the information processing apparatuses in this embodiment and are installed in different use environments 111 to 114 respectively. The use environments 111 to 114 illustrated in FIG. 1 are an intra-company environment 111, an Internet-direct-access environment 112, an Internet-access-inhibiting environment 113, and a home environment 114.

The intra-company environment 111 is an environment in which the image forming apparatus 101 and a personal computer (PC) 121 are connected to each other over an intra-corporate local area network (LAN) 131. At the boundary between the LAN 131 and an Internet 100, a firewall 141 is installed.

That is, communication between the Internet 100 and information processing apparatuses in the intra-company environment 111 is monitored and protected by the firewall 141. Therefore, in the intra-company environment 111, threats, such as access to the information processing apparatuses by attackers over the Internet 100, are significantly reduced.

In contrast, in the Internet-direct-access environment 112, no firewall is installed. The Internet-direct-access environment 112 is an environment in which the image forming apparatus 102 and a PC 122 are directly connected to the Internet 100 and communicate. Therefore, for information processing apparatuses such as the image forming apparatus 102 and the PC 122, measures against threats such as access by attackers over the Internet 100 need to be taken by, for example, using a personal firewall function of each of the information processing apparatuses.

The Internet-access-inhibiting environment 113 is a closed network environment isolated from a different network such as the Internet 100. Information processing apparatuses such as the image forming apparatus 103 and a PC 123 are connected to each other over a LAN 133. In the Internet-access-inhibiting environment 113, network communication can be performed only between the information processing apparatuses connected to the LAN 133. The information processing apparatuses are not accessed by any unspecified user over the Internet 100.

The home environment 114 is an environment in which the image forming apparatus 104 and a PC 124 are connected to each other over a home LAN 134. Although the LAN 134 is a private network constituted by a home router 144, unlike in the intra-company environment 111, security measures using a robust firewall are not introduced. Therefore, for information processing apparatuses installed in the home environment 114, measures against threats such as access by attackers over the Internet 100 need to be taken by, for example, using a personal firewall function of each of the information processing apparatuses as in the Internet-direct-access environment 112.

In addition to the use environments 111 to 114, a public space environment and a highly-confidential-information management environment not illustrated are assumed in this embodiment. Classification into these six use environments will be described in detail with reference to FIG. 2.

Figure 2:
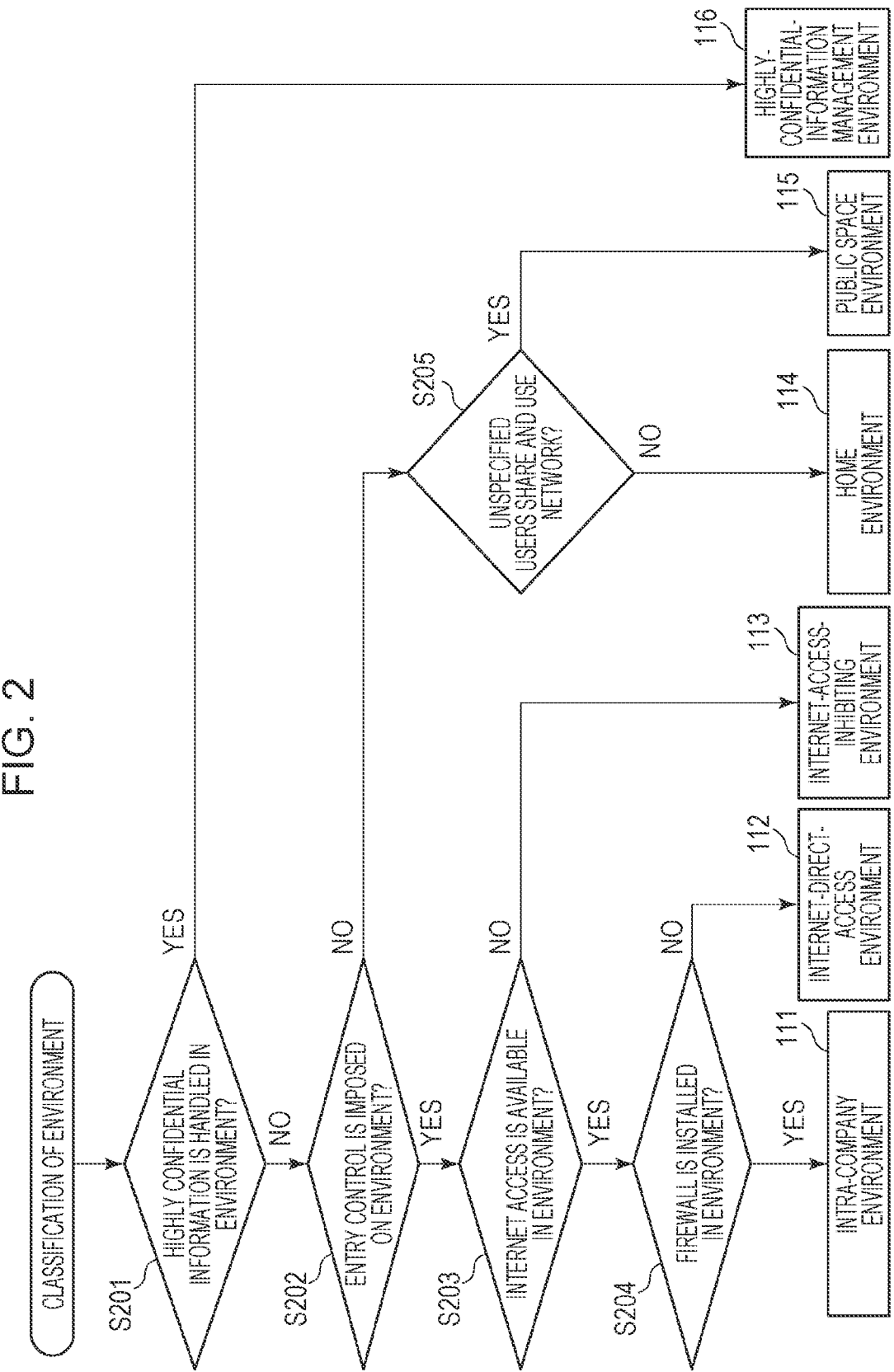
FIG. 2 is a flowchart illustrating example conditions for classifying the use environments of information processing apparatuses.

In this embodiment, the use environments of information processing apparatuses are classified into the six categories, and security settings suitable for each of these categories are provided. FIG. 2 is a flowchart illustrating the idea of classification when a use environment is classified and defined. The definitions of use environments described below are not intended to limit the present disclosure, and some of the use environments described in this embodiment or other use environments may be defined. For example, installation in companies may be assumed, and use environments may be classified according to their type of business such as finance business or government and municipal offices.

S201 is a step of classification based on whether information that is highly confidential is handled in the environment. An environment in which highly confidential information is handled is considered to be an environment for which security measures need to be given top priority. In this embodiment, such an environment for which security measures need to be given top priority is defined as a highly-confidential-information management environment 116.

If highly confidential information is not handled in the environment, more detailed classification of the use environment is performed. S202 is a step of classification based on whether entry control is imposed on the environment. This classification is example classification based on whether an unspecified user can physically access an information processing apparatus in the environment, that is, whether users entering the place where the information processing apparatus is installed are limited. Therefore, the classification condition based on whether physical access is possible is not limited to the classification condition based on entry control in this embodiment and may be a classification condition based on other than entry control. Entry control in this embodiment need not be implemented as an entry-leaving control system using cards. For example, an environment in which only persons belonging to an organization are working during business hours, for which entry-allowed persons are substantially limited, and which is locked outside business hours is an environment on which entry control is imposed.

If entry control is not imposed, that is, if an unspecified user can physically access an information processing apparatus in the environment, more detailed classification of the use environment is performed on the basis of a classification condition in S205. S205 is a step of classification based on whether unspecified users share and use a network in the environment. In this embodiment, an environment in which unspecified users share and use a network in the environment is defined as a public space environment 115. An environment in which no unspecified users share a network in the environment is defined as the home environment 114. In this embodiment, an environment such as the home environment 114 in which no unspecified users share a network in the environment, that is, an environment in which users can be identified, is defined as a private network environment.

The use environment that is classified in S202 as an environment on which entry control is imposed is further classified in detail according to a classification condition in S203. S203 is a step of classification based on whether an information processing apparatus in the environment is connected to an external network such as the Internet. An environment that is not connected to an external network such as the Internet is defined as the Internet-access-inhibiting environment 113. The Internet-access-inhibiting environment 113 on which entry control is imposed and which is assumed to be a closed network is a private network environment.

If an information processing apparatus in the environment is connected to an external network such as the Internet, the use environment is further classified in detail according to a classification condition in S204. S204 is a step of classification based on whether a firewall is installed. An environment in which a firewall is installed is defined as the intra-company environment 111. An environment in which no firewall is installed is defined as the Internet-direct-access environment 112. The intra-company environment 111 in which users using a network in the environment can be limited with a firewall is a private network environment.

The six use environments described above and security measures to be taken for each of the use environments will be described with reference to Table 1. Here, seven example security measures are listed.

TABLE 1

|  | Intra-company environment | Internet-direct-access environment | Internet-access-inhibiting environment | Home environment | Public space environment | Highly-confidential-information management environment |
| --- | --- | --- | --- | --- | --- | --- |
| Encryption on communication paths | Recommended | Recommended | Optional | Recommended | Recommended | Recommended |
| Disabling of legacy protocols | Recommended | Recommended | Optional | Recommended | Recommended | Recommended |
| Enabling of personal firewall | Optional | Recommended | Optional | Recommended | Recommended | Recommended |
| Security enhancement of authentication | Recommended | Recommended | Optional | Recommended | Recommended | Recommended |
| Measure against physical attacks | Optional | Optional | Optional | Recommended | Recommended | Recommended |
| Disabling of file sharing function | Optional | Recommended | Optional | Optional | Recommended | Recommended |
| Disabling of external storage devices | Recommended | Recommended | Recommended | Recommended | Recommended | Recommended |

Encryption on communication paths is a security measure for preventing information leaks by encrypting the content of communication over a network. An example function for implementing encryption on communication paths is Transport Layer Security (TLS). An environment connected to the Internet has the possibility of a third party eavesdropping on the content of communication, and therefore, encryption on communication paths is desirable. That is, encryption on communication paths is recommended except for the Internet-access-inhibiting environment 113.

Disabling of legacy protocols is a security measure for preventing spoofing and information leaks by disabling functions that use non-secure legacy communication protocols. An example legacy protocol is Windows Internet Name Service (WINS). Similarly to encryption on communication paths, disabling of legacy protocols is desirably set for an environment connected to an external network such as the Internet. That is, disabling of legacy protocols is recommended except for the Internet-access-inhibiting environment 113.

A personal firewall is a firewall installed in an information processing apparatus. Similarly to usual firewalls, a personal firewall monitors communication between an information processing apparatus and an external network such as the Internet. Example personal firewalls include an IP filter and a port number filter. An IP filter is a security measure of reading destination information and source information of communication packets and allowing only communication packets set in advance. This can prevent unauthorized access and information leaks. A port number filter is a security measure of closing an unused port and preventing entry through the port. This can prevent Denial of Service (DoS) that is a cyberattack targeting vulnerabilities by putting a heavy load. An environment which is connected to an external network and in which no firewall is installed has the possibility of suffering information leaks and DoS, and therefore, enabling of a personal firewall is desirable. That is, enabling of a personal firewall is recommended except for the Internet-access-inhibiting environment 113 that is not connected to an external network and the intra-company environment 111 in which a firewall is installed.

Security enhancement of authentication is a security measure of prohibiting, for example, password caching or specifying the minimum number of characters of passwords to enhance a measure against spoofing. Use environments except for the Internet-access-inhibiting environment 113 in which connections are made within the isolated network have the possibility of suffering spoofing, and therefore, security enhancement of authentication is desirable.

A measure against physical attacks is a security measure for preventing physical information leaks. In the image forming apparatuses 101 to 104, temporary data of a print job and so on is generated in their hard disks. The image forming apparatuses 101 to 104 have a complete erase function of automatically and completely erasing the generated temporary data upon the end of the job. An example measure against physical attacks for the image forming apparatuses 101 to 104 is this complete erase function. As long as the function is set, temporary data is not read even if the hard disk is physically removed. In the home environment 114 and the public space environment 115 that are environments on which entry control is not imposed and in which physical access to an information processing apparatus is unable to be restricted, a measure against physical attacks is desirably taken. In the highly-confidential-information management environment 116 for which reduction of an information leak risk is given top priority, a measure against physical attacks is desirably taken.

A file sharing function is a function of sharing files on a network in an environment. In an environment in which unspecified users share a network in the environment, the file sharing function is desirably disabled to prevent information leaks. That is, disabling of the file sharing function is recommended except for private network environments in which specific users share a network in the environments. As described above, private network environments in this embodiment include the intra-company environment 111, the Internet-access-inhibiting environment 113, and the home environment 114. Therefore, in environments other than these environments, that is, in the Internet-direct-access environment 112, the public space environment 115, and the highly-confidential-information management environment 116, disabling of the file sharing function is recommended. Example setting related to the file sharing function is Server Message Block (SMB) server setting.

Disabling of external storage devices is a measure of making the use of, for example, a Universal Serial Bus (USB) storage device not allowed for an information processing apparatus as an external storage device. This can prevent information from being written to an external storage device and prevent information leaks. This can also prevent infection by computer viruses through a USB storage device and information leaks associated with the infection. Threats of information leaks through an external storage device such as a USB storage device are common to all of the use environments. Therefore, disabling of external storage devices is desirable in all of the use environments.

Possible setting items and set values that are based on the security measures described above and that are recommended for each of the use environments are listed in Table 2. For an item that is recommended to set, a recommended set value such as "ON", "OFF", or "rejected" is indicated. In response to a user selecting a use environment on a screen illustrated in FIG. 5A described below, recommended set values for the selected use environment are applied by processes illustrated in FIG. 7 described below.

The image forming apparatuses 101 to 104, which are examples of the information processing apparatus, have various types of setting items such as setting items related to security functions and other setting items and perform various types of control in accordance with set values corresponding to the setting items. Items of security functions that are set by batch in this embodiment are 22 items listed in Table 2.

TABLE 2

|  | Intra-company environment | Internet-direct-access environment | Internet-access-inhibiting environment | Home environment | Public space environment | Highly-confidential-information management environment |
| --- | --- | --- | --- | --- | --- | --- |
| TLS setting | ON | ON | n/a | ON | ON | ON |
| WINS setting | OFF | OFF | n/a | OFF | OFF | OFF |
| Default policy of IP address filter | n/a | Rejected | n/a | Rejected | Rejected | Rejected |
| Exceptional address of IP address filter | n/a | Subnet address of image forming apparatus | n/a | Subnet address of image forming apparatus | Subnet address of image forming apparatus | Subnet address of image forming apparatus |
| Cache saving of authentication password of external server | Prohibited | Prohibited | n/a | Prohibited | Prohibited | Prohibited |
| Minimum number of characters of passwords | 8 characters | 8 characters | n/a | 8 characters | 8 characters | 8 characters |
| Complete erasing of hard disk | n/a | n/a | n/a | ON | ON | ON |
| SMB server setting | n/a | OFF | n/a | n/a | OFF | OFF |
| Use of USB external storage devices | OFF | OFF | OFF | OFF | OFF | OFF |
| Use of LPD printing | n/a | OFF | n/a | OFF | OFF | OFF |
| Use of RAW printing | n/a | OFF | n/a | OFF | OFF | OFF |
| Use of WSD printing | n/a | OFF | n/a | OFF | OFF | OFF |
| Use of IPP printing | n/a | n/a | n/a | n/a | n/a | ON |
| Use of SNMPv1 | n/a | OFF | n/a | OFF | OFF | OFF |
| Use of dedicated ports | n/a | OFF | n/a | n/a | OFF | OFF |
| Automatic deletion of suspended jobs | n/a | n/a | n/a | ON | ON | ON |
| Transmission result report | n/a | n/a | n/a | OFF | OFF | OFF |
| Mandatory use of PIN upon simple login | n/a | n/a | n/a | ON | ON | ON |
| Display of job status before authentication | n/a | n/a | n/a | OFF | OFF | OFF |
| Display of job history | n/a | n/a | n/a | OFF | OFF | OFF |
| Obtaining of audit log | ON | ON | ON | ON | ON | ON |
| Saving of key operation log | ON | ON | ON | ON | ON | ON |

Line Printer Daemon (LPD), RAW, Web Services on Devices (WSD), and Internet Printing Protocol (IPP) are printing protocols for communication between a client device and a printer. Unlike other protocols, IPP itself provides functions of user authentication, access control, and communication data encryption, and therefore, is a printing protocol that is more secure than other protocols. Therefore, "use of IPP printing" is recommended to be set to "ON" in highly-confidential-information management environments that require high security. For LPD, RAW, and WSD that provide security lower than IPP, use of these protocols in printing is recommended to be set to "OFF" except for intra-company environments that are reliable environments and Internet-access-inhibiting environments.

Simple Network Management Protocol (SNMP) is a protocol for monitoring and controlling communication devices on a network and is able to check the number of printed sheets, error information, and so on by using a PC. Although SNMPv1 determines a communication range on the basis of information called a community name, the community name is communicated over a network in plaintext, and therefore, SNMPv1 involves an information leak risk. Therefore, use of SNMPv1 is recommended to be set to "OFF" except for intra-company environments that are reliable environments and Internet-access-inhibiting environments that are not connected to the Internet.

A dedicated port is a port used to set or refer to printer information from, for example, a printer driver. When the item "use of dedicated ports" is set to "OFF", printer information is unable to be obtained upon use of, for example, a printer driver through a network connection. Internet-direct-access environments and public space environments are at the risk of information leaks, and therefore, this item is recommended to be set to "OFF". For highly-confidential-information management environments that require high security, this item is also recommended to be set to "OFF".

Automatic deletion of suspended jobs is a function of automatically deleting a print job that is suspended due to, for example, an error. This function can avoid a situation in which a suspended print job is resumed after a period of time and printed material is left unattended, and can reduce an information leak risk. This setting is recommended to be set to "ON" for home environments and public space environments on which entry control is not imposed and highly-confidential-information management environments that require high security.

A transmission result report is a report for checking whether transmission to a target destination is successfully completed. This item is used to set whether a report about the results of transmission, such as transmission by facsimile, email, and Internet facsimile and saving on a file server or in a user box, is automatically printed. Setting the item "transmission result report" to "OFF" can avoid a situation in which a report that includes information about transmitted content, a transmission history, and so on is left unattended at a printer, and can reduce an information leak risk. For home environments and public space environments on which entry control is not imposed and highly-confidential-information management environments that require high security, this item is recommended to be set to "OFF".

Simple login is a method of login by pressing a user name displayed on an operation panel and is a method that can avoid the trouble of inputting a user name. For simple login, a personal identification number (PIN) can be set. For this item, whether a PIN is to be always used can be set. When a PIN is not used, a user can easily log in by only selecting a user name displayed on the operation panel, but this involves a spoofing risk. Setting this item to "ON" can reduce a spoofing risk. This setting is recommended to be set to "ON" for home environments and public space environments on which entry control is not imposed and highly-confidential-information management environments that require high security.

"Display of job status before authentication" is an item that allows setting as to whether a screen on which the job status can be checked is displayed before authentication, under the assumption that a login service is used. Setting this item to "OFF" can prevent the job status from being seen by a large number of unspecified persons and can reduce an information leak risk. This setting is recommended to be set to "OFF" for home environments and public space environments on which entry control is not imposed and highly-confidential-information management environments that require high security.

A job history is a history of print jobs and includes information about the user names of users who have given print instructions, the document names of printed documents, and so on. Setting "display of job history" to "OFF" can prevent information about document names, the user names of users who have printed the documents, and so on from being seen by a large number of unspecified persons and can reduce an information leak risk. This setting is recommended to be set to "OFF" for home environments and public space environments on which entry control is not imposed and highly-confidential-information management environments that require high security.

When an audit log function is used, an audit of security events can be carried out. For example, an audit can be carried out to check unauthorized access to a device or an attempt to gain unauthorized access, with a user authentication log, and to check unauthorized use of a device, with a log of use of the device, the use including printing, document transmission, and setting changes. A key operation log is a log of key operations performed by users and includes a key operation log of, for example, login operations. When theses logs are saved and analyzed, how the printer has been operated can be investigated. In the event of unauthorized access or unauthorized use by a user, obtaining or saving an audit log or a key operation log can prevent the user from denying the unauthorized access or unauthorized use. All environments are at the risk of denial, and therefore, setting these setting items to "ON" is recommended to the six environments in common.

Although not included in Table 2, the following setting items can be added for highly-confidential-information management environments that require high security. Examples of the setting items include "use of Mopria", "use of AirPrint", and "use of remote UI".

For home environments, the following items can be added. Examples of the items include items related to the admin password for Printer Job Language (PJL) or for Embedded Web Server (EWS) and items related to SNMPv1/v2 and SNMPv3. For example, the administrator password for PJL or EWS is controlled so as not to be changed from a device to which settings for home environments are applied by batch. SNMP is a device management protocol that is used when the administrator obtains or sets set values of an image forming apparatus such as a printing apparatus over a network. When SNMP can be used, for example, set values of functions of an image forming apparatus can be changed as desired, and therefore, a privilege necessary for setting the set values can be managed. Setting of a privilege or the like related to the device management protocol can be controlled so as not to be changed in a home environment so that setting changes are not made by a general teleworking user after a group of set values conforming to a policy determined by the company have been reflected. A setting item related to checking and updating of the firmware version can also be added. A setting item for choosing whether to restrict access to a PJL command and a setting item related to redirection to HTTPS can also be added.

Note that the set values are not limited to the values indicated in Table 2 and may be any set values that are suitable for each of the use environments. For example, a firewall is installed in intra-company environments, and therefore, Table 2 indicates that a personal firewall need not be set. However, both a firewall installed in the office and a personal firewall may be used. Based on such a background, batch setting including setting of a personal firewall can be performed also for an intra-company environment and an Internet-access-inhibiting environment. The same applies to other setting items.

Among the setting items included in Table 2, for example, TLS setting and setting related to a personal firewall are setting items related to networks in general. In contrast, items related to printing protocols and an item such as display of a print job history related to a function of an image forming apparatus or device management are setting items specific to the image forming apparatus.

This embodiment provides an information processing apparatus that performs setting suitable for a selected use environment on the basis of the definitions of environment categories and the recommended set values for the security functions described above. A specific description will be given below.

Hardware Configuration of Image Forming Apparatus 101

Figure 3:
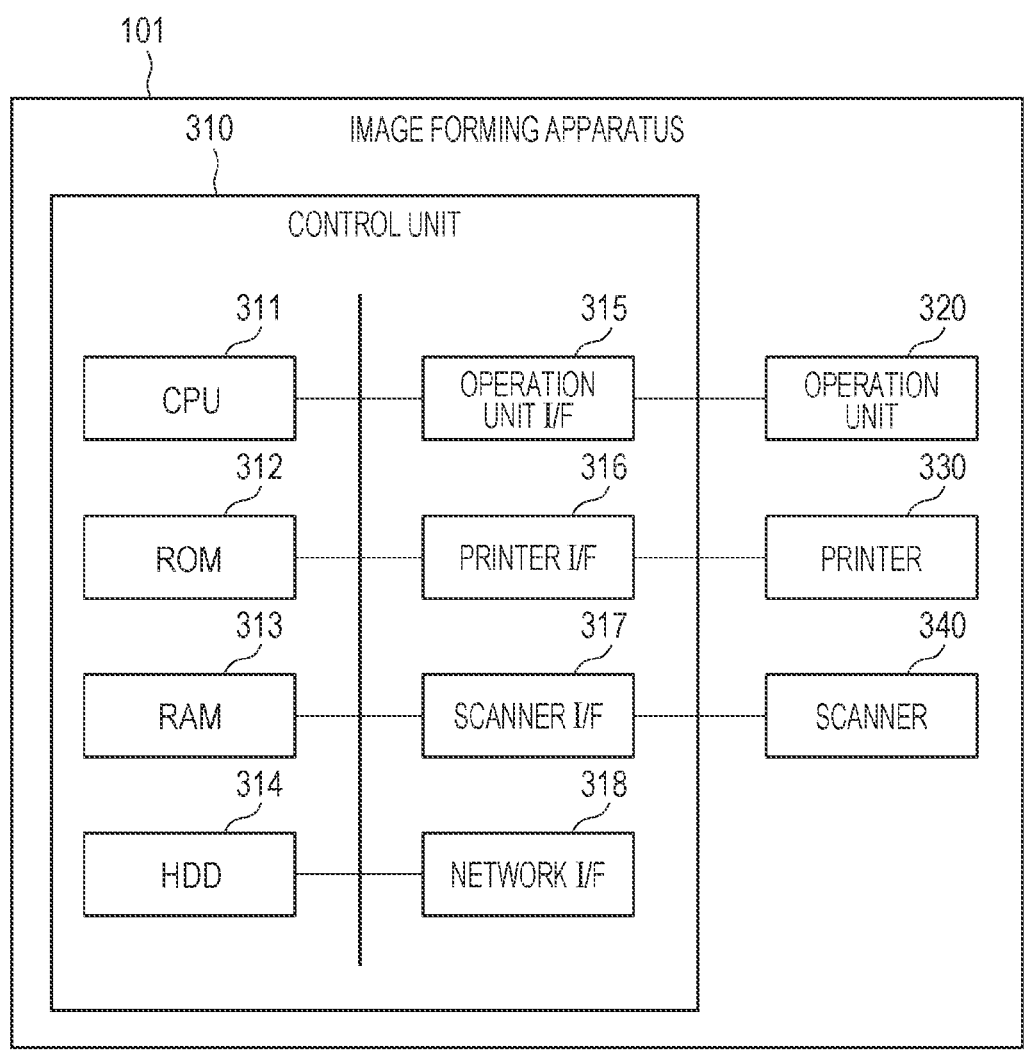
FIG. 3 is a diagram illustrating an example hardware configuration of an image forming apparatus.

A hardware configuration of the image forming apparatus 101, which is an example of the information processing apparatus in this embodiment, will be described with reference to FIG. 3. Although only a description of the image forming apparatus 101 will be given with reference to FIG. 3, the image forming apparatuses 102 to 104 and an image forming apparatus (not illustrated) installed in a public space environment or a highly-confidential-information management environment are assumed to have configurations similar to that of the image forming apparatus 101.

The image forming apparatus 101 includes a printer 330 that outputs electronic data to a paper medium and a scanner 340 that reads a paper medium and converts the read content to electronic data. Although the image forming apparatus 101 having a plurality of functions is described as an example of the information processing apparatus in this embodiment, the information processing apparatus is not limited to this example. The information processing apparatus may be, for example, a single-function apparatus such as a printer or a scanner. The information processing apparatus may be a 3D printer or a 3D scanner.

A control unit 310 that includes a central processing unit (CPU) 311 controls the overall operations of the image forming apparatus 101. A read-only memory (ROM) 312 is used to store programs executed by the CPU 311. The CPU 311 reads a control program stored in the ROM 312 and performs various types of control, such as read control and transmission control, in the image forming apparatus 101. A random access memory (RAM) 313 is used as a temporary storage area including a main memory and a work area of the CPU 311. A hard disk drive (HDD) 314 is a storage device that stores image data, various programs, and various types of setting information. The control unit 310 may include another storage device such as a solid state drive (SSD). Accordingly, hardware including the CPU 311, the ROM 312, the RAM 313, and the HDD 314 constitute a computer.

An operation unit interface (I/F) 315 connects an operation unit 320 and the control unit 310 with each other.

The operation unit 320 includes a liquid crystal display unit having a touch panel function and various hardware keys. The operation unit 320 functions as a display unit that displays information to a user and an accepting unit that accepts user instructions.

A printer I/F 316 connects the printer 330 and the control unit 310 with each other. Image data printed by the printer 330 is transferred from the control unit 310 via the printer I/F 316. The input image data is output to a recording medium by the printer 330. A scanner I/F 317 connects the scanner 340 and the control unit 310 with each other. The scanner 340 reads a document placed on document glass not illustrated and generates image data. The generated image data is input to the control unit 310 via the scanner I/F 317.

To a network I/F 318, a network cable is connected to enable communication with an external apparatus on the LAN 131. Although this embodiment assumes that the network I/F 318 is a communication interface for wired communication, the network I/F 318 is not limited to this. The network I/F 318 may be, for example, a wireless communication interface. Although the network I/F 318 of the image forming apparatus 101 is connected to the LAN 131, a network to which the network I/F 318 is connected differs depending on the use environment.

For example, the image forming apparatus 102 is directly connected to the Internet 100. The image forming apparatuses 103 and 104 are respectively connected to the LANs 133 and 134.

Software Configuration of Image Forming Apparatus 101

Figure 4:
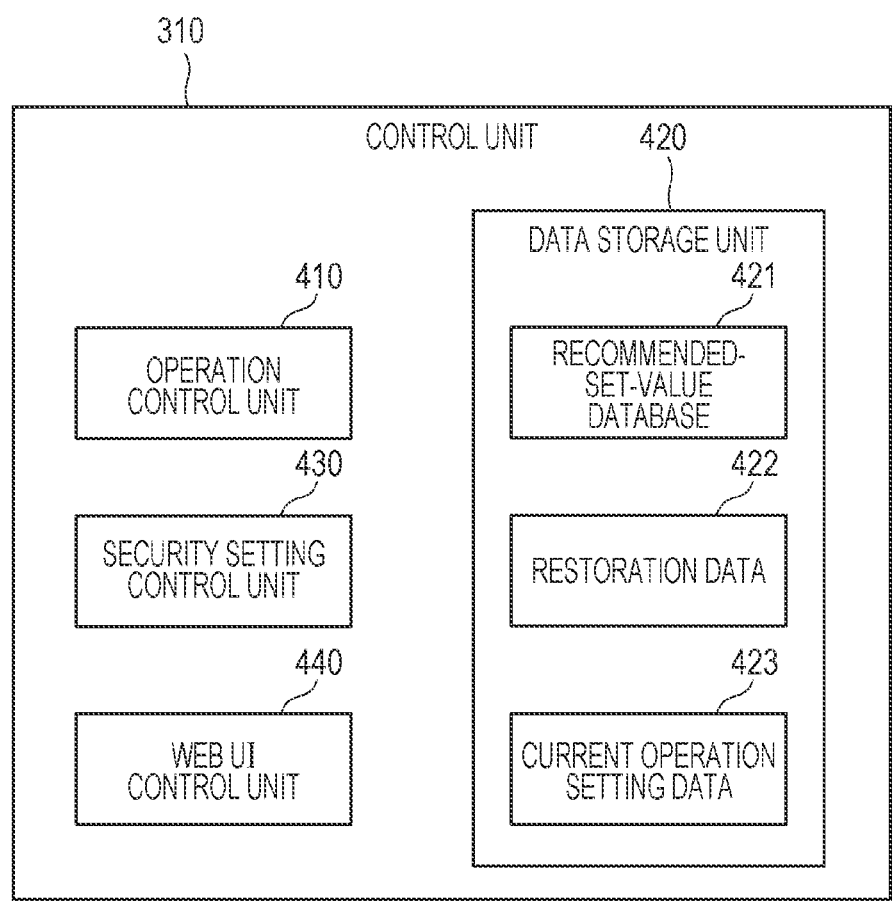
FIG. 4 is a diagram illustrating an example software configuration of the image forming apparatus.

A software configuration of the image forming apparatus 101, which is an example of the information processing apparatus in this embodiment, will be described with reference to FIG. 4. Units illustrated in FIG. 4 are implemented by the CPU 311 executing a program stored in the ROM 312 and corresponding to the units.

An operation control unit 410 displays a screen for a user on the operation unit 320. The operation control unit 410 detects a user operation and switches the screen or updates the display on the basis of the result of detection.

A data storage unit 420 stores data in the HDD 314 and read data from the HDD 314 in accordance with a request from a control unit. The data storage unit 420 stores setting information for determining operations of the image forming apparatus 101 and information about settings of security functions. Specifically, the data storage unit 420 stores a recommended-set-value database 421, restoration data 422, and current operation setting data 423.

The recommended-set-value database 421 is a database as illustrated in Table 2 described above. That is, the recommended-set-value database 421 is a database in which combinations of setting items of the security functions and set values suitable for a use environment of the image forming apparatus 101 are associated with the use environments classified into the plurality of categories. Here, the setting items are items of TLS setting, WINS setting, and so on. The set values are "ON", "OFF", "rejected", and so on indicated in Table 2. In Table 2, a setting item for which the set value is indicated as "n/a" indicates that the setting item does not have a recommended set value.

That is, the set value for such a setting item is not changed, and a pre-setting-change set value is taken over.

In this embodiment, the recommended-set-value database 421 is defined in advance by the vendor of the image forming apparatus 101 and stored in the data storage unit 420.

The restoration data 422 is data of combinations of setting items and set values applied before a user selects an environment type on a screen 500 in FIG. 5A described below. In this embodiment, the restoration data 422 is stored when an environment type is selected for the image forming apparatus 101 for the first time. In this embodiment, the restoration data 422 may be stored when an environment type is selected for the first time after a cancel button (not illustrated) displayed on the screen for selecting an environment type has been pressed. In this embodiment, when a user selects an environment type a number of times successively, the restoration data 422 is not updated. In this embodiment, the restoration data 422 is used when a user changes the environment type set for the image forming apparatus 101 by selecting an environment type for the second time onward. When the restoration data 422 is overwritten with recommended setting data suitable for a newly selected environment type, setting data newly applied to the image forming apparatus 101 is determined.

The current operation setting data 423 is data of combinations of setting items and set values currently applied to the image forming apparatus 101. Upon a setting change, the current operation setting data 423 is rewritten. Thereafter, in response to a restart of the image forming apparatus 101, the current operation setting data 423 that has been rewritten is read by a program, and the image forming apparatus 101 operates in accordance with the applied settings.

A security setting control unit 430 sets the security functions of the image forming apparatus 101 by batch in accordance with a user instruction detected by the operation control unit 410. Specific setting control will be described below with reference to FIG. 7. Batch setting in this embodiment is a function that enables batch setting of recommended set values for typical security functions defined by the vendor. Hereinafter, batch setting is also referred to as a batch setting function. The batch setting function is different in nature from a function of applying a security policy edited by a user and prohibiting a setting of a specific security setting item from being changed to a setting that does not meet the policy. That is, even when a user who is, for example, the administrator performs batch setting by using the batch setting function, the user can change the set value of an individual setting item to a different set value again on an individual setting change screen not illustrated, in accordance with the actual usage.

In this embodiment, in response to a user selecting a use environment on the screen 500 described below, the security setting control unit 430 creates new operation setting data by using recommended setting data suitable for the selected use environment. Specifically, the security setting control unit 430 first reads the current operation setting data 423, the restoration data 422, and recommended setting data suitable for the selected use environment from the data storage unit 420. When an environment type is selected on the screen 500 in a state in which settings have not been applied to the image forming apparatus 101 by batch in response to environment selection, the security setting control unit 430 overwrites the current operation setting data 423 with the recommended setting data. When an environment type is selected in a state in which settings have been applied to the image forming apparatus 101 by batch in response to environment selection, the security setting control unit 430 overwrites the restoration data 422 with the recommended setting data. In this embodiment, upon overwriting with a value, when the recommended setting data includes a value ("ON", "OFF", "reject" or the like indicated in Table 2) for a setting item corresponding to a specific security function, the set value is changed to the recommended set value.

When the recommended setting data does not include a value ("n/a" indicated in Table 2) for the item, the set value remains the same as the value in the current operation setting data 423 or in the restoration data 422 and is not changed. With the above-described process, the security setting control unit 430 determines newly set combinations of setting item and set values for the security functions. Newly set setting data need not be determined with the method described above. For example, the security setting control unit 430 may overwrite the current operation setting data 423 with the recommended setting data even in a state in which settings have been applied to the image forming apparatus 101 by batch in response to environment selection.

A Web user interface (UI) control unit 440 controls a setting screen displayed on an external information processing apparatus such as the PC 121 via the network OF 318. A user can refer to and change settings of the image forming apparatus 101 on a setting screen in a Web browser provided by the Web UI control unit 440. The Web UI control unit 440 may have a function of importing and exporting the recommended-set-value database 421. With this function, a user can create and edit a data file related to the recommended-set-value database 421, on the PC 121. The recommended-set-value database 421 that has been edited can be transmitted to the image forming apparatus 101 and stored in the data storage unit 420. Note that the Web UI control unit 440 can be omitted in this embodiment.

Setting screens displayed on the operation unit 320 of the image forming apparatus 101 will be described with reference to FIGS. 5A to 5E. Although the setting screens displayed on the operation unit 320 of the image forming apparatus 101 will be described in this embodiment, this embodiment need not be configured as described above. For example, Web pages similar to the setting screens may be provided to a Web browser of an external information processing apparatus via the Web UI control unit 440, and setting operations may be performed on the Web pages.

The screen 500 is a screen displayed on the operation unit 320 by the operation control unit 410. Use environment list buttons 501 are buttons for a user to select a use environment. The user selects a use environment of the image forming apparatus 101 by pressing a corresponding one of the use environment list buttons 501 and presses an enter button 502 on the screen 500. FIG. 5A illustrates an example state of the screen 500 on which the user selects an Internet-direct-access type as the use environment of the image forming apparatus 101 for which a home type has been set. When detecting pressing of the enter button 502, the operation control unit 410 of the image forming apparatus 101 transmits information indicating the result of selection of the use environment by the user to the security setting control unit 430. The security setting control unit 430 determines whether a set value exists that is changed when recommended settings for the use environment selected by the user are applied, and displays a screen corresponding to the change in the set value that is made in accordance with environment selection. A process for determining whether a set value to be changed exists will be described below with reference to FIG. 7.

In this embodiment, an example screen that is displayed when a function exists for which a new set value is set to OFF as a result of the change in the set value and which is disabled is described. If a setting item for which the set value is changed and is set to OFF exists, the operation control unit 410 displays a screen 510 illustrated in FIG. 5B. Otherwise, the operation control unit 410 displays a screen 520 illustrated in FIG. 5C. When detecting a user operation of pressing a cancel button 511 on the screen 510, the operation control unit 410 displays the screen 500. When detecting a user operation of pressing a button 512 for applying the use environment type on the screen 510, the operation control unit 410 transmits information indicating the result of selection by the user to the security setting control unit 430. The security setting control unit 430 sets for the security functions by batch, settings suitable for the use environment selected by the user and received from the operation control unit 410.

Figure 5A:
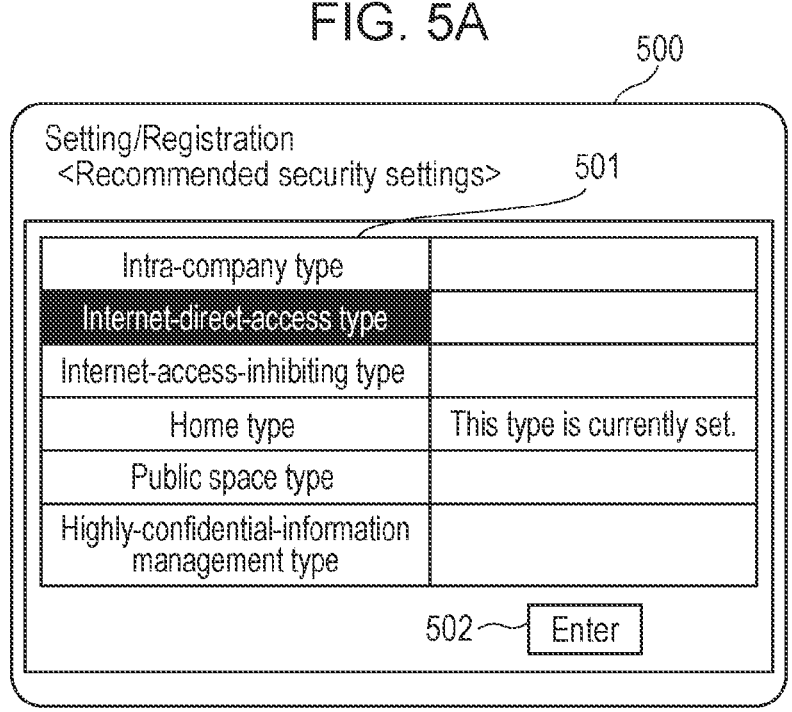
FIGS. 5A to 5E are diagrams illustrating example screens displayed on an operation unit of the image forming apparatus in a first embodiment.
Figure 5B:
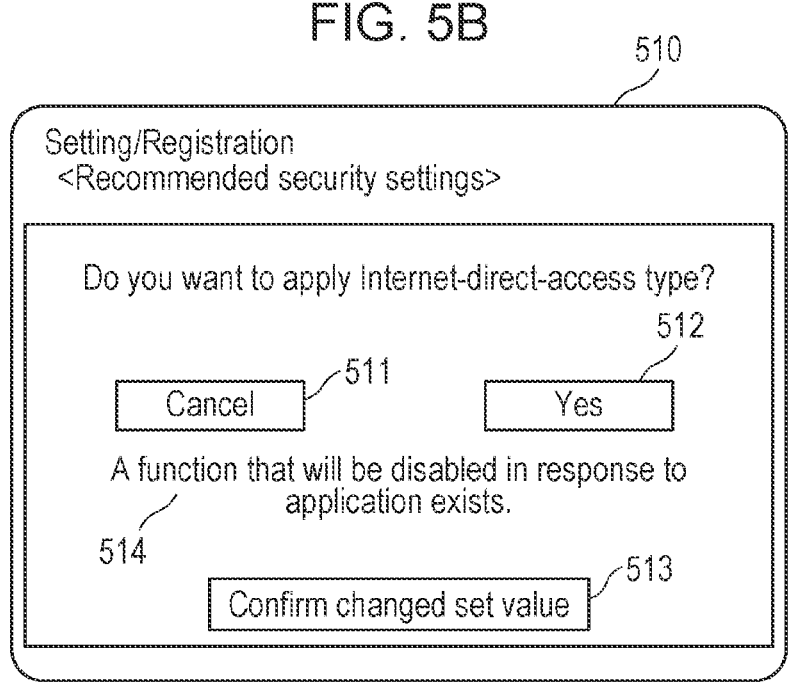
Figure 5C:
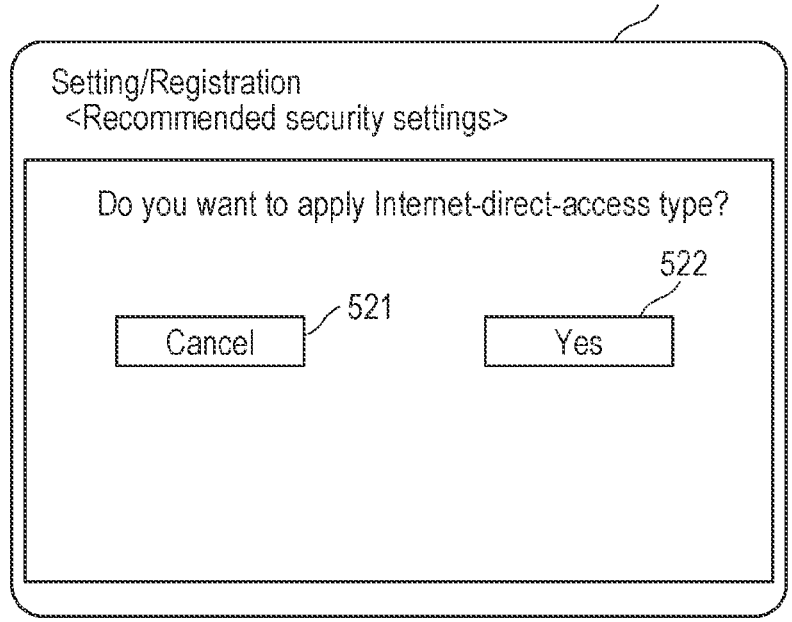
Figure 5D:
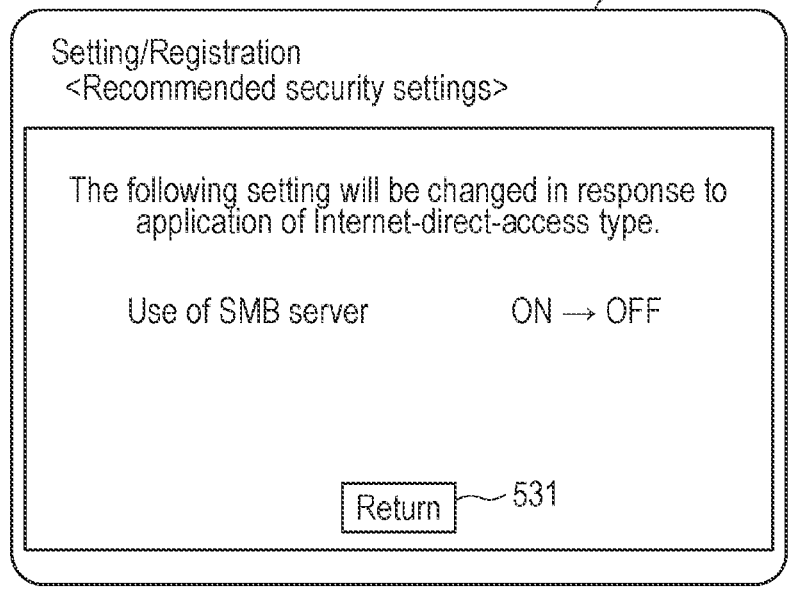
Figure 5E:
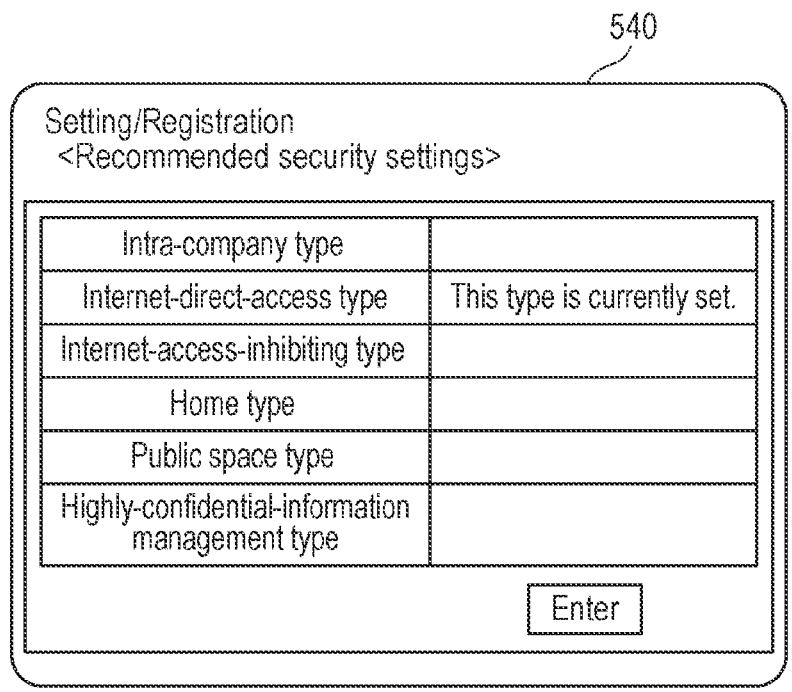

After the setting by batch, the operation control unit 410 displays a screen 540 illustrated in FIG. 5E.

When detecting a user operation of pressing a cancel button 521 on the screen 520, the operation control unit 410 similarly displays the screen 500. When detecting a user operation of pressing a button 522 for applying the use environment type, the operation control unit 410 transmits information indicating the result of selection by the user to the security setting control unit 430. The security setting control unit 430 sets for the security functions by batch, settings suitable for the use environment selected by the user and received from the operation control unit 410. After the setting by batch, the operation control unit 410 displays the screen 540 illustrated in FIG. 5E. The screen 540 shows that the use environment of the image forming apparatus 101 is set to the Internet-direct-access type.

A description of the screen 510 will be further given. A notification 514 on the screen 510 is a notification for notifying the user that a function that is disabled in response to application of the environment type selected on the screen 500 exists. A button 513 notifies the user that a change in a set value is made in response to application of the selected use environment. When detecting pressing of the button 513, the operation control unit 410 displays a screen 530 illustrated in FIG. 5D. On the screen 530, a setting item for which a change is made in response to application of the environment type, a pre-change set value, and a post-change set value are displayed. That is, the screen 530 is a screen for providing a notification of the details of the change in the set value made in response to application of the environment type. On the screen 530, the user can confirm the set value that is disabled in response to application of recommended settings for the selected use environment. FIG. 5D illustrates an example where the set value of the setting item "use of SMB server" is changed from ON to OFF in response to application of recommended settings for the Internet-direct-access type to the image forming apparatus 101. When detecting pressing of a button 531, the operation control unit 410 displays the screen 510 again.

As described above, in this embodiment, when a function that is disabled in response to a change in a security setting exists, a notification that the change in the set value is made can be provided to the user. Accordingly, the user can intuitively understand that the function that is disabled exists. Therefore, the user can reconsider the setting change or can know in advance that the function is disabled and take an action to, for example, reconsider their work flow so as not to use the function.

Figure 6A:
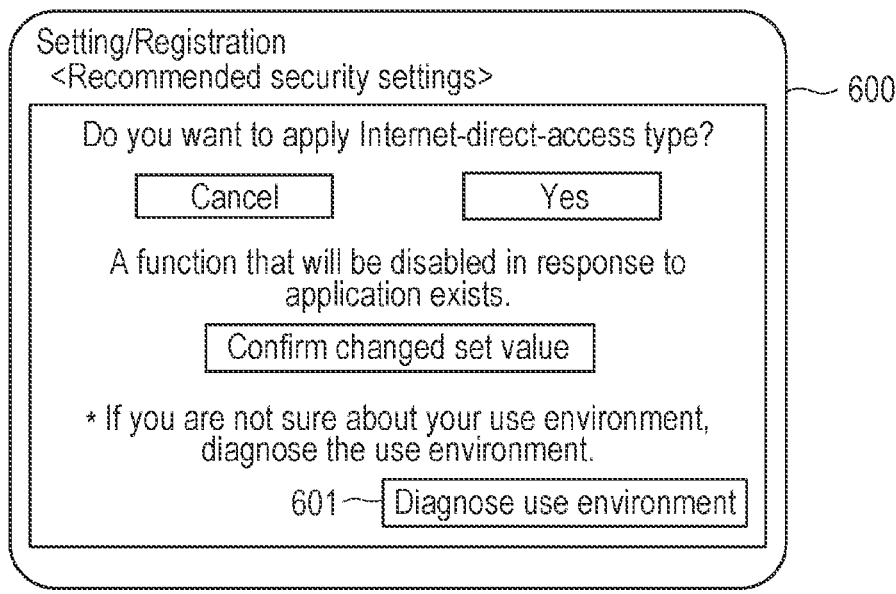
FIGS. 6A and 6B are diagrams illustrating example screens displayed on the operation unit of the image forming apparatus in the first embodiment.

Instead of the screen described with reference to FIG. 5B, a screen that includes a button 601 illustrated in FIG. 6A may be displayed. The button 601 is a button for a transition to a function of assisting the user in selecting a use environment. In response to pressing of the button 601, the image forming apparatus 101 identifies the use environment and provides a question wizard not illustrated for notifying the user of a recommended use environment.

Specifically, the image forming apparatus 101 provides a question wizard based on the classification categories described with reference to FIG. 2. For example, the image forming apparatus 101 first makes an inquiry to the user about whether highly confidential information is handled. When obtaining an inquiry result indicating that highly confidential information is handled, the image forming apparatus 101 determines that the recommended use environment type is the highly-confidential-information management environment. On the other hand, when obtaining an inquiry result indicating that highly confidential information is not handled, the image forming apparatus 101 makes an inquiry to the user about whether the image forming apparatus 101 is installed in an environment on which entry control is imposed. Thereafter, the image forming apparatus 101 appropriately makes an inquiry about whether the environment is an Internet-access environment, an inquiry about whether a firewall is installed, an inquiry about whether a large number of unspecified users share a network, and so on and notifies the user of a recommended use environment type.

Figure 6B:
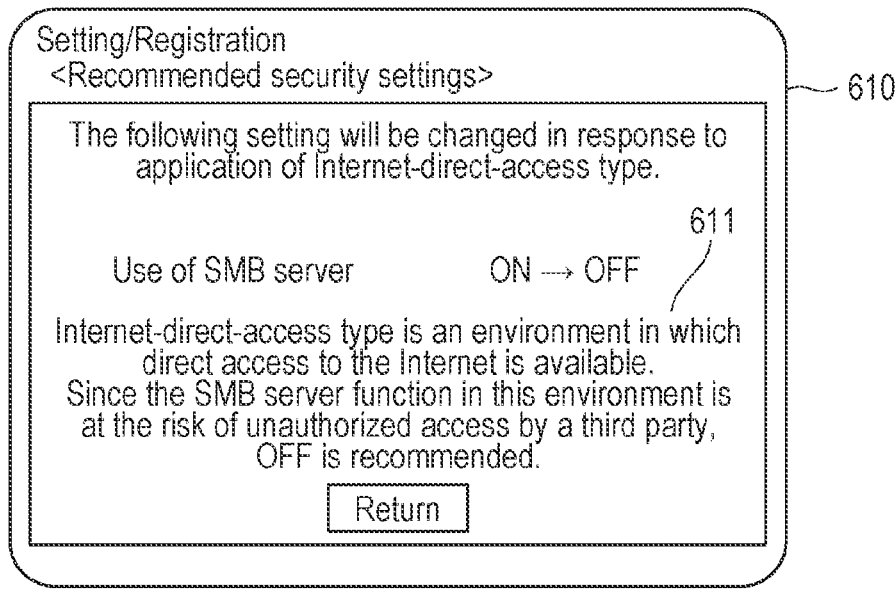

Instead of the screen illustrated in FIG. 5D, a screen illustrated in FIG. 6B may be displayed. On a screen 610 illustrated in FIG. 6B, a notification 611 is displayed for notifying the user of the reason why the setting change is recommended, that is, the reason why the setting change is made in response to application of the environment type.

Figure 7:
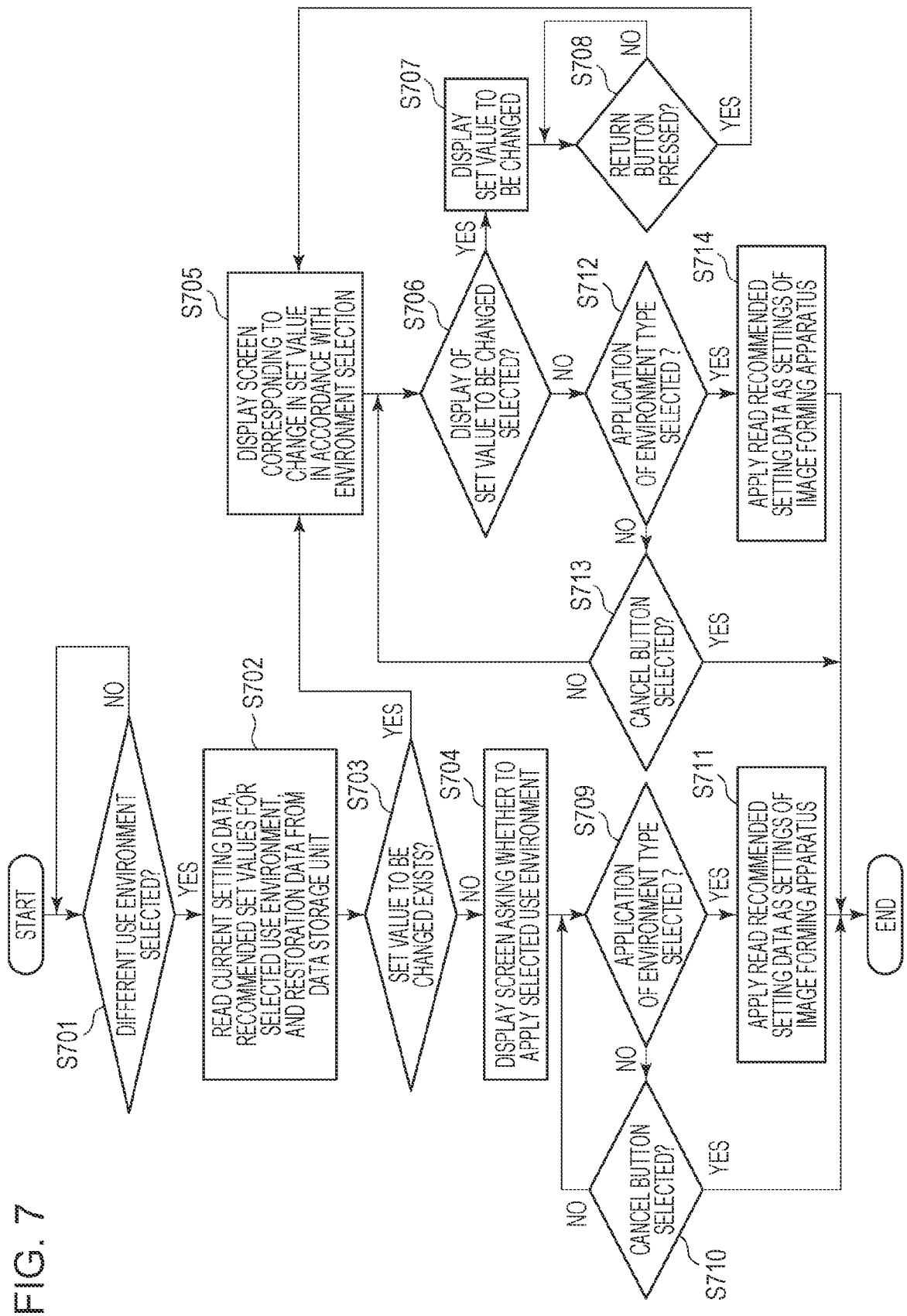
FIG. 7 is a flowchart illustrating example processes performed by the image forming apparatus.

Processes from selection of a use environment by a user on the screen 500 to batch setting of the security functions will be described with reference to FIG. 7. The operations (steps) illustrated in the flowchart in FIG. 7 are implemented by the CPU 311 loading a program, for implementing the control units, stored in the ROM 312 or the HDD 314 to the RAM 313 and executing the program. When a processing entity is to be clearly indicated in a description, a software module executed by the CPU 311 is described as the subject of the description.

When the operation control unit 410 detects an operation for displaying the screen 500 performed on a menu screen (not illustrated) displayed on the operation unit 320 and the operation control unit 410 displays the screen 500 on the operation unit 320, the series of processes illustrated in FIG. 7 starts.

In S701, the security setting control unit 430 waits for selection of a use environment different from the currently set use environment, and in response to selection, the flow proceeds to S702. Specifically, the operation control unit 410 accepts an operation of selecting a type different from the currently set use environment type and an operation of selecting the enter button 502 on the screen 500 illustrated in FIG. 5A. When detecting the operations, the operation control unit 410 determines that a different use environment is selected and transmits information indicating the result of selection to the security setting control unit 430. When the security setting control unit 430 receives the information, the flow proceeds to S702.

In S702, the security setting control unit 430 reads the current operation setting data 423 and the restoration data 422 stored in the data storage unit 420. The security setting control unit 430 extracts and reads from the recommended-set-value database 421 recommended set values stored in association with the use environment selected in S701.

In S703, the security setting control unit 430 determines whether a set value that is changed in response to application of the use environment selected in S701 exists. Specifically, the security setting control unit 430 first creates setting data that is newly set in the image forming apparatus 101 in response to environment selection in S701. In this flow, in a state in which an environment type has already been applied to the image forming apparatus 101, the flow proceeds to S702 in response to selection of an environment type different from the applied environment type in S701. Therefore, the security setting control unit 430 overwrites the restoration data 422 read in S702 with the recommended setting data to thereby create newly set setting data. Subsequently, the security setting control unit 430 compares the created newly set setting data with the current operation setting data 423 read in S702 and determines whether a setting item for which the value differs exists. If a setting item for which the value differs exists, the security setting control unit 430 determines that a set value that is changed in response to application of the use environment selected in S701 exists, and the flow proceeds to S705. If a setting item for which the value differs does not exist, the flow proceeds to S704.

In S705, the operation control unit 410 displays a screen corresponding to the change in the set value that is made in accordance with environment selection. In this embodiment, if the set value is set to OFF in response to the change in the set value, the operation control unit 410 displays the screen 510 on the operation unit 320, and the flow proceeds to S706. Specifically, the operation control unit 410 determines whether a post-change value of the set value determined in S703 to be changed is OFF, and if the post-change value is OFF, the operation control unit 410 displays the screen 510. If the set value is not set to OFF in response to the change in the set value, the flow may proceed to S704, and subsequently, processes may be performed according to the flow in FIG. 7. In S706, the operation control unit 410 determines whether display of the set value to be changed is selected.

Specifically, the operation control unit 410 performs determination on the basis of whether the operation control unit 410 detects pressing of the button 513 on the screen 510. If the operation control unit 410 detects pressing of the button 513, the flow proceeds to S707. If the operation control unit 410 does not detect pressing of the button 513, the flow proceeds to S712.

In S707, the operation control unit 410 displays the screen 530. In S708, the operation control unit 410 determines whether the return button 531 is pressed on the screen 530. If the operation control unit 410 detects pressing of the return button 531, the flow returns to S705, and the operation control unit 410 displays the screen 510. If the operation control unit 410 does not detect pressing of the return button 531, the flow returns to S708, and the operation control unit 410 keeps the screen 530 displayed.

If the operation control unit 410 detects selection of the yes button 512 on the screen 520 in S712, the operation control unit 410 transmits information indicating the result of selection to the security setting control unit 430, and the flow proceeds to S714. If the operation control unit 410 does not detect selection of the yes button 512, the flow proceeds to S713. If the operation control unit 410 detects selection of the cancel button 511 in S713, the flow ends, and the operation control unit 410 displays the screen 500. If the operation control unit 410 does not detect selection of the cancel button 511, the flow returns to S706.

In S714, the security setting control unit 430 applies the recommended setting data suitable for the use environment selected by the user in S701 to the image forming apparatus 101. The method for determining setting data newly set in the image forming apparatus 101 is as described above. The security setting control unit 430 overwrites the restoration data 422 read in S702 with the recommended setting data suitable for the use environment selected by the user in S701. The security setting control unit 430 rewrites the current operation setting data 423 with the newly determined data and applies the current operation setting data 423 to the image forming apparatus 101. The method for determining the new setting data is not limited to the method described above.

A flow in a case where the security setting control unit 430 determines in S703 that a set value that is changed does not exist will be described. In S704, the operation control unit 410 displays the screen 520 on the operation unit 320 and the flow proceeds to S709. The processes in S709 to S711 are similar to those in S712 to S714. However, if the operation control unit 410 does not detect pressing of the cancel button 521 in S710, the flow returns to S709.

With the series of processes described above, when a user is made to select a use environment of the information processing apparatus, the settings of the security-related functions can be set to settings suitable for the selected use environment by batch. At this time, a notification that a function that is disabled exists is provided to thereby avoid an issue that, for example, a function desired by the user is disabled without the user knowing it. A setting item and its set value that is changed to OFF are displayed, and the user can know which function is disabled. Accordingly, the security functions can be set more conveniently.

Second Embodiment

In the first embodiment, a description has been given of a case where the use environment is changed from a currently set environment type to a different environment type on the setting screen 500 as illustrated in FIG. 5A and where a notification that a function exists that is disabled in response to a set value being changed to OFF is provided. In a second embodiment, example notifications different from that provided in S705 in the first embodiment will be described. As examples of the notification in S705, three example notifications including that in the first embodiment are possible. The three example notifications will be described below.

The first example is the example in the first embodiment. Examples of setting items for functions that are disabled in response to the set values being changed to OFF include "SMB server setting" and "display of job history" in Table 2. When these set values are changed to OFF, the SMB server function and the job history function are disabled.

The second example is an example where a notification is provided when a security measure is enhanced and a function is restricted regardless of whether the set value is changed to OFF. For example, although not included in Table 2, an item "prohibition of authentication with department ID and PIN" is possible as a setting item related to authentication. When the set value of this item is set to ON, an authentication function based on a department ID and a PIN is restricted. For example, when the minimum number of characters of passwords is increased and changed from, for example, 8 characters to 16 characters, a password setting function becomes less convenient, which is regarded as the function being restricted. In S705, a screen corresponding to a change in a set value that enhances a security measure while restricting a function may be displayed. At this time, a notification similar to the notification 514 is displayed on the screen. That is, a notification that use of at least one function is restricted in response to application of the use environment selected on the screen 500 is provided. A method for determining whether the change in the set value determined in S703 is a change that enhances a security measure and restricts a function will be described below. For determination, the data storage unit 420 stores a database of set values with which functions are restricted when the set values are set. An example of the database is indicated in part in the following table.

TABLE 3

| Setting item | Set value |
| --- | --- |
| SMB server setting | OFF |
| Display of job history | OFF |
| Prohibition of authentication with department ID and PIN | ON |
| Minimum number of characters of passwords | 16 characters |

In S705, the security setting control unit 430 reads the database. The security setting control unit 430 compares a post-change value of the set value that is determined in S703 to be changed, with a corresponding value in the database. When the post-change value and the value in the database are the same for a specific setting item, the security setting control unit 430 can determine that a function that is restricted in response to environment selection exists. For the minimum number of characters of passwords, the security setting control unit 430 may determine that the function is restricted when the number of characters increases from a pre-change value to a post-change value without comparing the numeric value stored as illustrated in Table 3 with the post-change value.

The two examples of notifications described above can avoid an issue that, for example, a function desired by the user is restricted without the user knowing it and can make setting of security functions more convenient.

The third example is an example where a set value is changed in response to a change in the environment type, resulting in a security measure being relaxed. When a security measure is relaxed, a notification of this relaxation is provided. Specifically, such a case includes a case where "SMB server setting" is changed to ON and a case where "prohibition of authentication with department ID and PIN" is changed to OFF. The case where a security measure is relaxed also includes a case where "the minimum number of characters of passwords" is decreased and is changed from, for example, 16 characters to 8 characters. When a security measure is relaxed, a determination method in which a database including set values with which security measures are relaxed is stored and determination is performed may be employed as in the above-described case where a function is restricted.

A determination method as described below may also be employed. For example, when the Internet-direct-access type is applied, the set value of "use of SMB server" is set to OFF. When the home type is applied in this state, the restoration data 422 is overwritten with recommended setting data for the home type, and new setting data is determined. In Table 2, the recommended set value of SMB server setting for the home type is indicated as "n/a". That is, for this setting item, the set value in the restoration data 422 remains unchanged. When the value in the restoration data 422 is ON, the set value after application of the home type is ON. When a default set value is a value with which a security measure is relaxed, the following determination method may be employed. When a set value is changed in response to environment selection and returns to a default value, it is determined that a security measure is relaxed. Specifically, when a post-change set value determined in S703 is the same as a corresponding value in the restoration data 422, it can be determined that a security measure is relaxed in response to environment selection. Note that a default set value is not necessarily a value with which a security measure is relaxed, and therefore, when a security measure is enhanced in response to a set value returning to a default set value, the notification in S705 need not be provided.

A screen configuration in the third example where a security measure is relaxed will be described. The hardware configuration and the software configuration of the image forming apparatus 101 according to this embodiment are the same as those in the first embodiment, and therefore, descriptions thereof are omitted. The process flow is also the same as that in the first embodiment except for the process in S705 described above, and therefore, a description thereof is omitted.

Figure 8A:
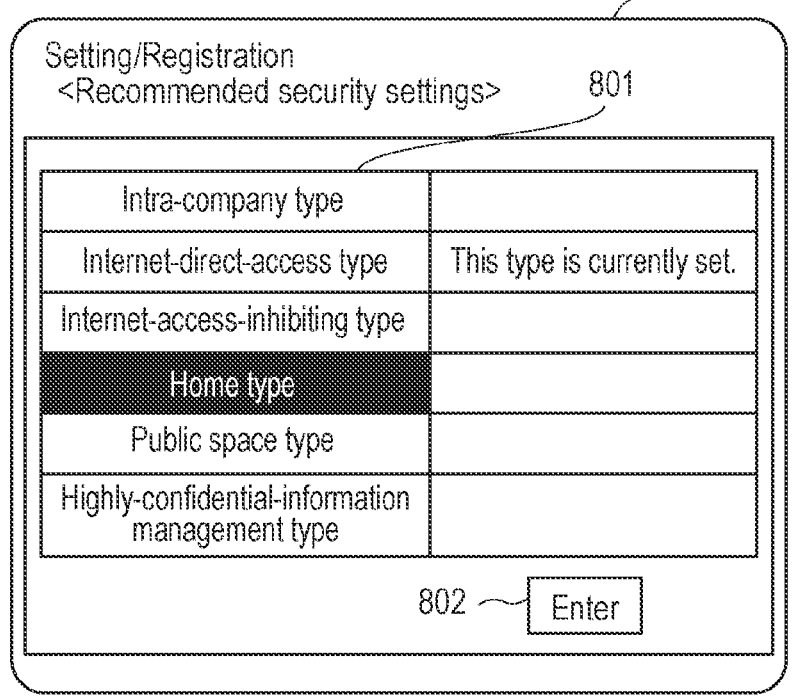
FIGS. 8A to 8E are diagrams illustrating example screens displayed on the operation unit of the image forming apparatus in a second embodiment.
Figure 8B:
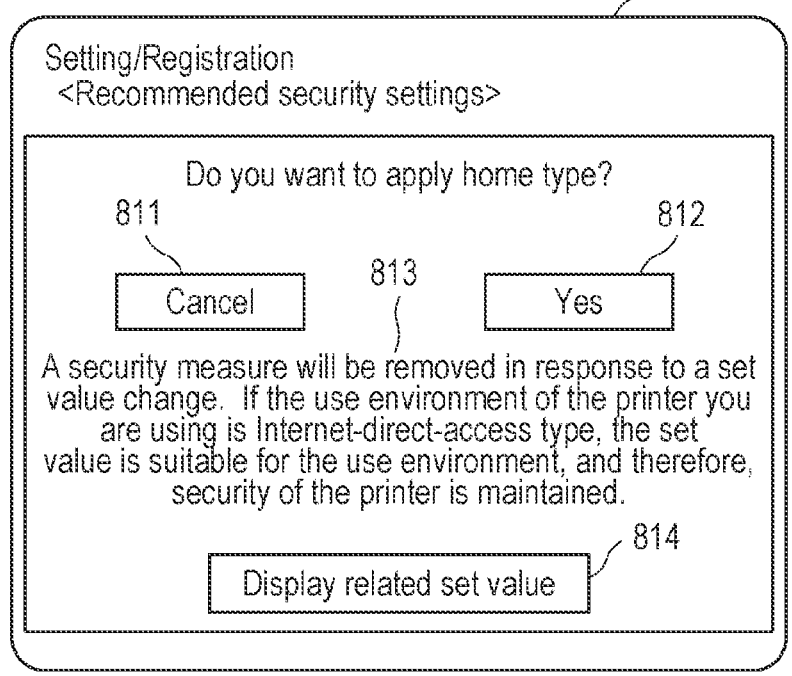

With reference to FIGS. 8A to 8E, the screen configuration in this embodiment will be described. A setting screen 800 is a screen displayed on the operation unit 320 by the operation control unit 410 and is the same as the screen 500. FIG. 8A illustrates an example state of the setting screen 800 on which a user selects the home type as the use environment for the image forming apparatus 101 for which the Internet-direct-access type has been set. Use environment list buttons 801 are buttons for the user to select a use environment. The user selects a use environment of the image forming apparatus 101 by pressing a corresponding one of the use environment list buttons 801 and presses an enter button 802 on the setting screen 800. FIG. 8A illustrates an example state of the setting screen 800 on which the user selects the home type as the use environment of the image forming apparatus 101. When detecting pressing of the enter button 802, the operation control unit 410 of the image forming apparatus 101 transmits information indicating the result of selection of the use environment by the user to the security setting control unit 430. The security setting control unit 430 compares the current operation setting data 423 set in the image forming apparatus 101 with new setting data created by using recommended settings for the use environment selected by the user and determines whether a set value with which a security measure is relaxed exists.

In this embodiment, when a set value with which a security measure is relaxed exists, the operation control unit 410 displays a screen 810 instead of the screen 510 illustrated in FIG. 5B. When detecting a user operation of pressing a cancel button 811, the operation control unit 410 displays the setting screen 800. The operation control unit 410 detects a user operation of pressing a button 812 on the screen 810 and transmits information indicating the result of selection by the user to the security setting control unit 430. The security setting control unit 430 sets for the security functions by batch, settings suitable for the use environment selected by the user and received from the operation control unit 410. A notification 813 is displayed in order to notify the user that a security function is relaxed in response to the change in the use environment but security is maintained as long as the selected use environment matches the actual use environment. A button 814 is a button for displaying to the user, a notification that a set value exists with which a security measure is relaxed in response to application of recommended settings for the selected use environment.

Figure 8C:
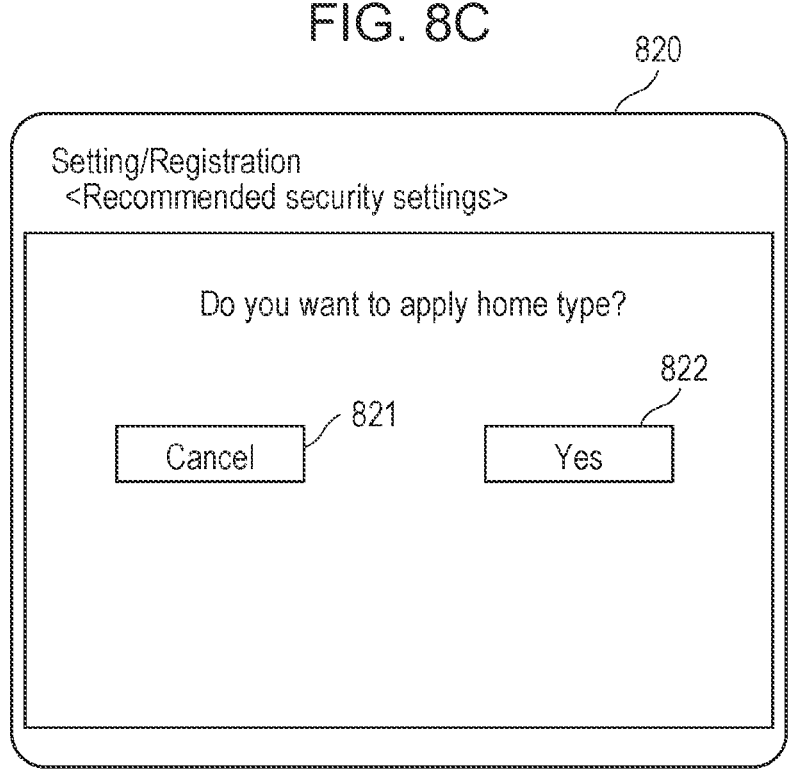
Figure 8D:
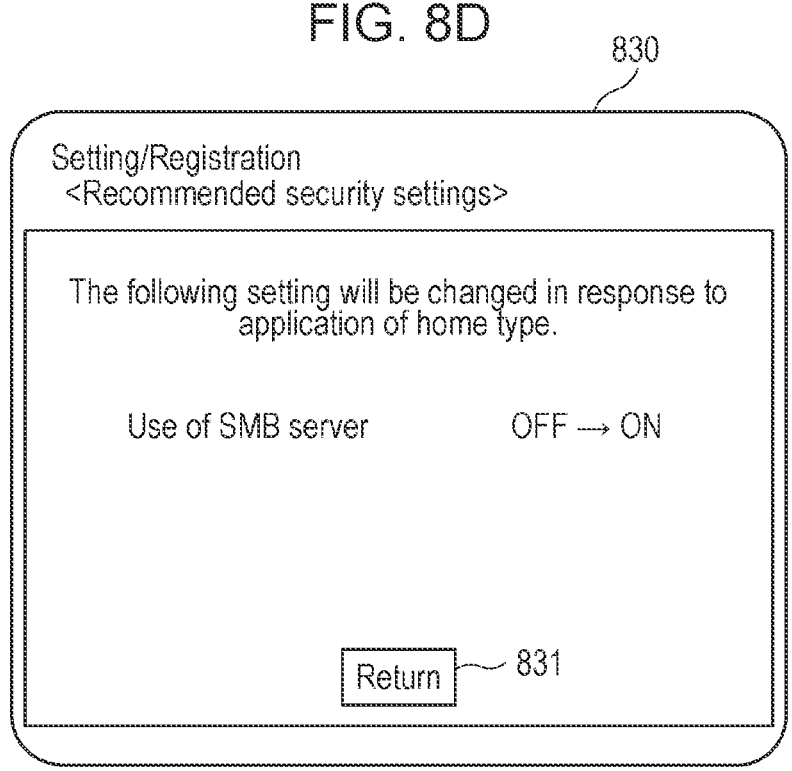
Figure 8E:
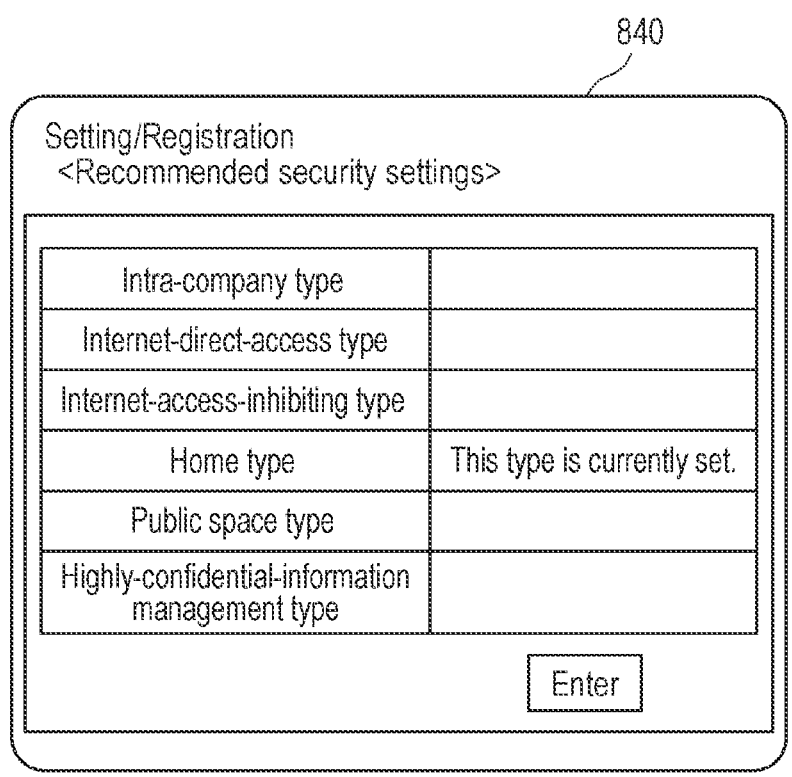

When detecting pressing of the button 814, the operation control unit 410 displays a screen 830 illustrated in FIG. 8D.

Figure 9:
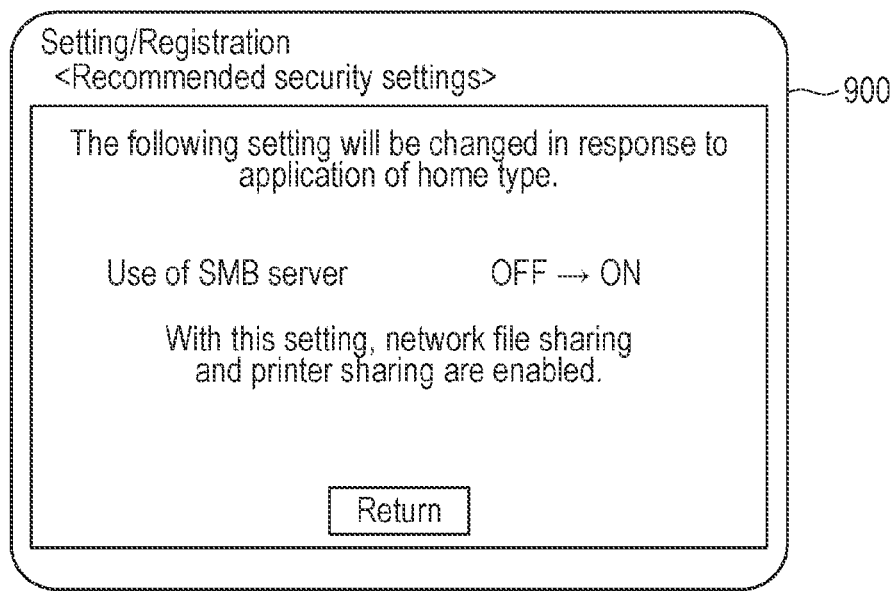
FIG. 9 is a diagram illustrating an example screen displayed on the operation unit of the image forming apparatus in the second embodiment.

The user confirms on the screen 830, the set value with which a security measure is relaxed in response to application of the recommended settings for the selected use environment. FIG. 8D illustrates an example case where a security measure related to an SMB server is relaxed in response to application of recommended settings for the home type to the image forming apparatus 101. As in a screen 900 illustrated in FIG. 9, an explanation of the change in the set value may be displayed. When detecting pressing of a button 831, the operation control unit 410 displays the screen 810 again.

When a set value with which a security measure is relaxed does not exist, the operation control unit 410 displays a screen 820 illustrated in FIG. 8C. When detecting a user operation of pressing a cancel button 821, the operation control unit 410 displays the setting screen 800. The operation control unit 410 detects a user operation of pressing a button 822 on the screen 820 and transmits information indicating the result of selection by the user to the security setting control unit 430. The security setting control unit 430 sets for the security functions by batch, settings suitable for the use environment selected by the user and received from the operation control unit 410.

With a notification that a security measure is relaxed in response to a change in the use environment, a notification that security is maintained even when the security measure is relaxed, and so on, a user-friendly screen can be provided.

In this embodiment, three example notifications displayed on the screen in S705 have been described. A plurality of notifications among the three example notifications may be combined and displayed on the screen. A case where, for example, the environment type is changed from the Internet-direct-access environment to the home environment will be considered on the basis of the database illustrated in Table 2. In this case, for "SMB server setting", when the set value in the restoration data 422 is ON, the set value is changed from OFF to ON. This is a setting change that relaxes a security measure. In contrast, for "display of job history", when the set value in the current operation setting data 423 is ON, the set value is changed from ON to OFF.

This is a setting change that enhances a security measure, and a function is restricted in response to the setting change. When a change in the environment type as described above is made, both a notification that a security measure is relaxed and a notification that a function is restricted may be displayed.

Third Embodiment

In the first embodiment and the second embodiment, examples where screens corresponding to a change in a set value that is made in accordance with selection of a use environment are displayed have been described. In a third embodiment, a configuration in which a set value to be applied to a setting item whose set value is changed is determined in accordance with a user instruction, and settings to which the user instruction is reflected are set by batch will be described. Specifically, for example, as indicated in the column of "disabling of file sharing function" in Table 1, for the home type, the user may optionally consider whether to set the value of SMB server setting to ON or OFF. In a case where a security measure is relaxed, for an item for which the user may optionally consider the set value, an instruction for the set value is accepted from the user and is reflected to settings set by batch, which can save the time taken for the user to separately open a setting screen and reset the set value. The hardware configuration and the software configuration of the image forming apparatus 101 according to this embodiment are the same as those in the first embodiment, and therefore, descriptions thereof are omitted.

Figure 10A:
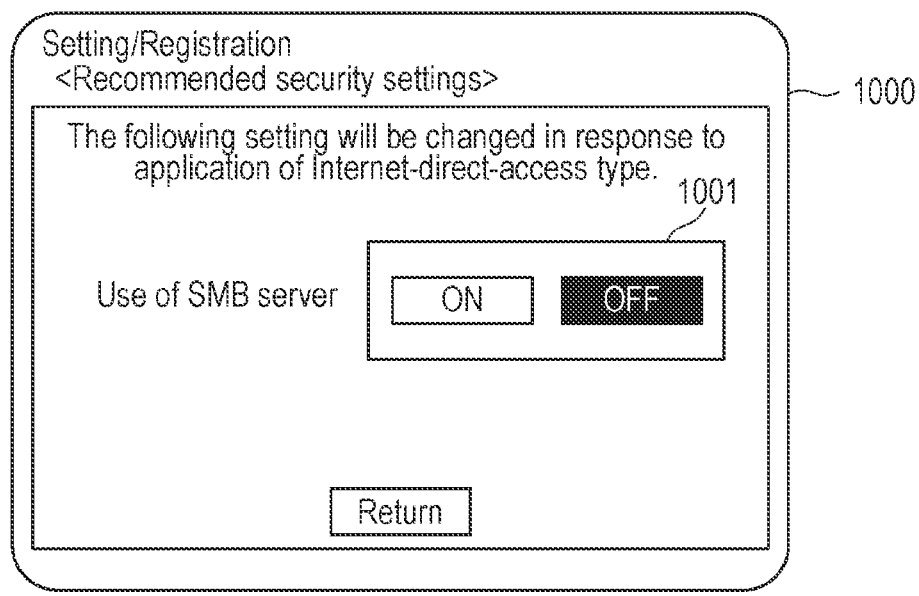
FIGS. 10A and 10B are diagrams illustrating example screens displayed on the operation unit of the image forming apparatus in a third embodiment.
Figure 10B:
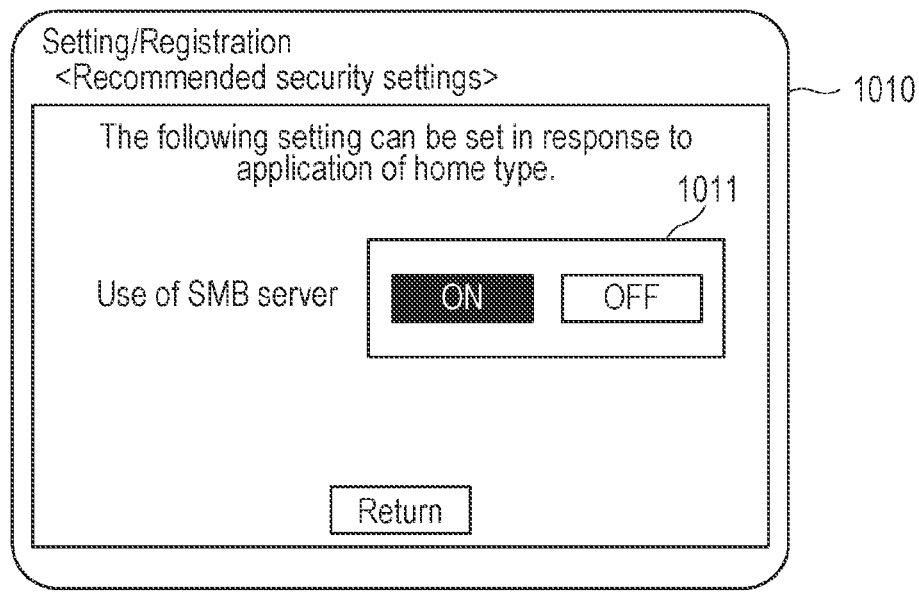

With reference to FIGS. 10A and 10B, a screen configuration in this embodiment will be described. FIG. 10A illustrates a setting screen that is displayed on the operation unit 320 of the image forming apparatus 101 instead of the screen 530 when a set value is changed to OFF as in the first embodiment. Although the setting screen displayed on the operation unit 320 of the image forming apparatus 101 will be described in this embodiment, this embodiment need not be configured as described above. For example, a Web page similar to the setting screen 500 may be provided to a Web browser of an external information processing apparatus via the Web UI control unit 440, and a setting operation may be performed on the Web page.

Because of space limitations, FIG. 10A illustrates an example screen that can be displayed on the operation unit 320. FIG. 10A illustrates an example where SMB server setting is changed to OFF in response to application of recommended settings for the Internet-direct-access type.

With a set value change button 1001 on a setting screen 1000, a user's answer about a set value is accepted. The operation control unit 410 detects a value of an individual set value selected by the user, from which new setting data can be created. Specifically, there may be a case where "use of SMB server" is set to OFF in response to application of recommended settings for the Internet-direct-access type but the user selects ON with the set value change button 1001. In this case, the recommended settings for the Internet-direct-access type is overwritten with "use of SMB server" being changed to ON to thereby create new setting data.

FIG. 10B illustrates an example setting screen displayed on the operation unit 320 instead of the screen 830 in a case where a setting item with which a security measure is relaxed exists as in the second embodiment. In this example, SMB server setting is changed to ON in response to application of the home type. With a set value change button 1011 on a setting screen 1010, a user instruction for a set value is accepted. The operation control unit 410 detects a value of an individual set value selected by the user, from which new setting data can be created.

Processes related to display of the screens illustrated in FIGS. 10A and 10B and batch setting of the security functions will be described with reference to FIG. 11. The operations (steps) illustrated in FIG. 11 are implemented by the CPU 311 loading a program, for implementing the control units, stored in the ROM 312 or the HDD 314 to the RAM 313 and executing the program.

Figure 11:
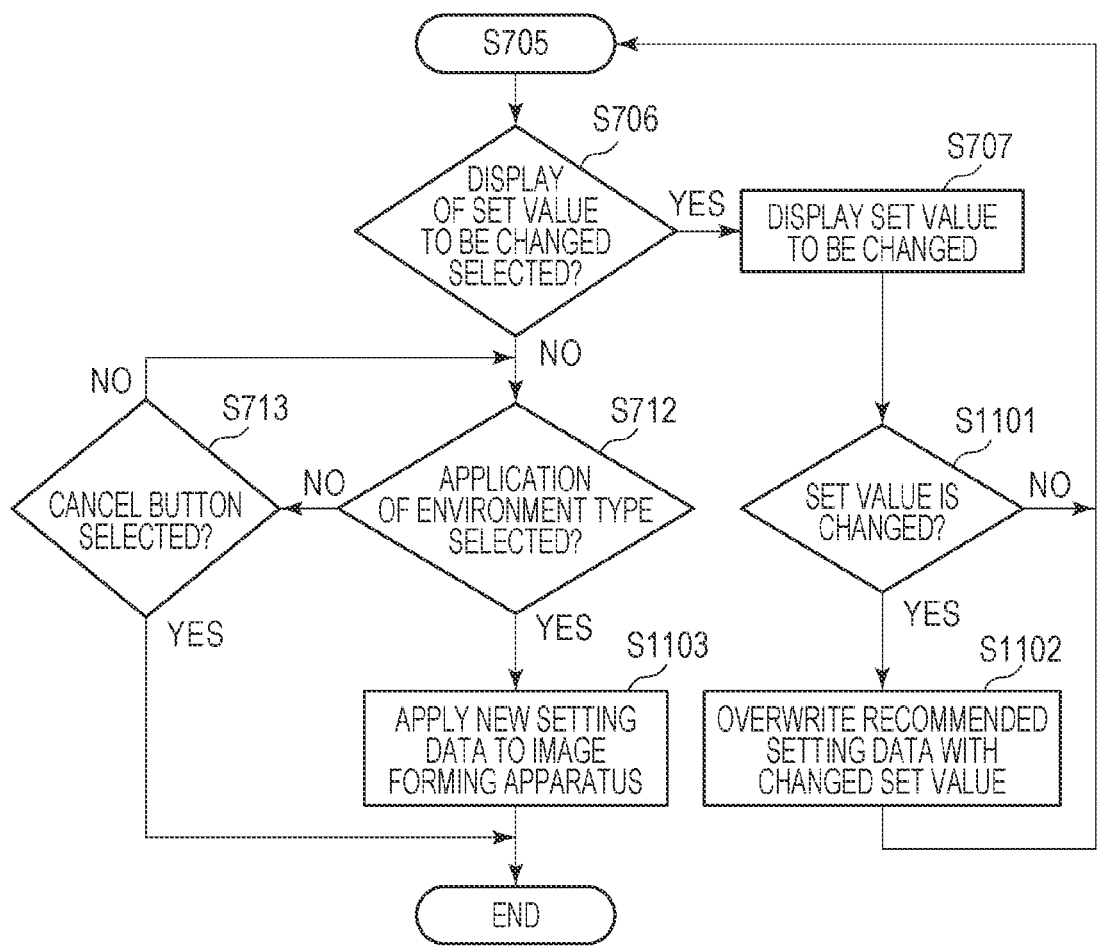
FIG. 11 is a flowchart illustrating example processes performed by the image forming apparatus in the third embodiment.

The steps illustrated in FIG. 11 are example processes performed instead of the processes in steps subsequent to S705 described with reference to FIG. 7 in the first embodiment. Processes the same as those in FIG. 7 are indicated by reference numerals the same as those in FIG. 7. FIG. 11 is different from the flowchart in FIG. 7 in that a setting change process in S1101 and S1102 is performed after the display process in S707.

In S707, the operation control unit 410 displays a screen showing a set value to be changed. In this embodiment, the screen illustrated in FIG. 10A is displayed instead of the screen in FIG. 5D that is displayed in the first embodiment. After completion of display, the flow proceeds to S1101.

In S1101, the operation control unit 410 determines whether a user operation for a change from the recommended set value to another set value is accepted on the screen illustrated in FIG. 10A. Specifically, when detecting an operation on a return button on the screen illustrated in FIG. 10A, the operation control unit 410 determines whether a user operation for a setting change is performed on the screen illustrated in FIG. 10A. If the operation control unit 410 determines that a user operation for a setting change is performed, the flow proceeds to S1102, and if the operation control unit 410 determines that a user operation for a setting change is not performed, the flow returns to S705.

In S1102, the security setting control unit 430 overwrites the recommended setting data read in S702 with the set value changed by the user on the screen illustrated in FIG. 10A. After completion of the process, the flow returns to S705.

S706, S712, and S713 are the same as those in the first embodiment. If application of an environment type is selected in S712, the flow proceeds to S1103. When the process in S1102 has not been performed, the security setting control unit 430 overwrites the current operation setting data 423 or the restoration data 422 with recommended setting data in S1103 as in the first embodiment. When the process in S1102 has been performed, the security setting control unit 430 overwrites the current operation setting data 423 or the restoration data 422 with the data created by overwriting with the changed set value in S1102. Accordingly, the security setting control unit 430 determines new setting data that is applied to the image forming apparatus 101. The security setting control unit 430 applies the determined new setting data to the image forming apparatus 101.

With the above-described processes, when the user sets recommended setting data for a use environment in the image forming apparatus 101 by batch, the user can select a set value by themselves for a specific setting item. A process of setting for the security functions by batch, settings suitable for the usage by the user can be implemented.

Modifications

In the above-described embodiments, a case has been described where processes for screen display and batch setting illustrated in FIG. 7 are performed by the image forming apparatus 101 or on a Web page provided to a Web browser of an external information processing apparatus via the Web UI control unit 440 of the image forming apparatus 101. The same processes may be performed by an information processing apparatus different from the image forming apparatus 101. For example, the security setting control unit 430 is implemented as an application that is installed and executed in the information processing apparatus. Display of setting screens and generation of current operation setting data are performed by the application. When the application is executed in the information processing apparatus, the processes performed by the security setting control unit 430 of the image forming apparatus in the first embodiment can be implemented in the information processing apparatus. Specifically, a security setting control unit of the external application performs processes described below.

First, in S701, the external application provides a screen similar to the setting screen illustrated in FIG. 5A or FIG. 8A. The screen of the application is provided to a Web browser running on, for example, a display device connected to the information processing apparatus or an external PC. The Web browser detects selection of an environment type different from the currently set type on the screen similar to the screen 500 or the screen 800. When the application accepts information indicating detection of the operation, the flow proceeds to S702.

In S702, the application reads current operation setting data and recommended setting data from a database stored in the application. The application determines whether a set value that is changed to OFF exists in S703. The database stored in the application includes data similar to the recommended-set-value database 421, the restoration data 422, and the current operation setting data 423 in the first embodiment.

The external application obtains data similar to the current operation setting data 423 from the image forming apparatus 101 over a network. Information is collected from the image forming apparatus 101 by using, for example, a device management protocol such as SNMP.

If the application determines in S703 that a set value that is changed to OFF exists, the flow proceeds to S705, and the application provides a screen similar to the screen 510. If the application determines in S703 that a set value that is changed to OFF does not exist, the flow proceeds to S704, and the application provides a screen similar to the screen 520.

In the subsequent processes, the Web browser detects a user operation on the screen 510 or the screen 520. The application performs processes similar to those in the first embodiment on the basis of whether the application accepts information indicating detection of the operation. In S711 or S714, the application transmits an instruction for changing operation settings to the image forming apparatus 101, on the basis of generated new setting data. For example, the application transmits an instruction for changing operation settings by using a SetRequest operation of SNMP. SNMP need not be used as the communication protocol for a setting change or as a method for giving an instruction for a setting change. For example, the application may generate a data file including setting items and set values for importing the set values and transmit the data file to the image forming apparatus 101. When receiving the data file, the image forming apparatus 101 changes its settings on the basis of the data file.

The image forming apparatus 101 receives the new setting data from the external application and applies the new setting data as settings of the image forming apparatus 101. The image forming apparatus 101 is restarted to reflect the applied settings to operations of the image forming apparatus 101.

With the above-described processes, the user can set the security functions of the image forming apparatus 101 with the application in an external information processing apparatus.

Other Embodiments

The present disclosure can be implemented as a process in which a program that implements one or more of the functions of the above-described embodiments is supplied to a system or an apparatus via a network or a storage medium, and one or more processors in a computer of the system or the apparatus read and execute the program. The present disclosure can also be implemented as a circuit (for example, an application-specific integrated circuit (ASIC) or a field-programmable gate array (FPGA)) that implements one or more of the functions.

With the information processing apparatus according to the present disclosure, when batch setting is performed in response to selection of an item associated with a use environment and at least one set value is to be changed consequently, a notification based on the change in the set value can be provided.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-093566 filed Jun. 9, 2022, which is hereby incorporated by reference herein in its entirety.

What is claimed is:

1. An information processing apparatus having a plurality of functions, the information processing apparatus comprising:
an accepting unit configured to accept selection of one environment from among a plurality of different environments as a use environment of the information processing apparatus;
a first notification unit configured to provide a notification of a function which is at least one of the plurality of functions and for which a change in use occurs when a group of set values corresponding to the selected one environment is set in the information processing apparatus;
a second notification unit configured to extract a set value related to the change in use from the group of set values and provide a notification of the set value; and
a setting unit configured to perform batch setting for the information processing apparatus on the basis of the group of set values in response to an instruction for setting the group of set values.

2. The information processing apparatus according to claim 1, wherein
the function for which the change in use occurs is a function for which a change in use occurs when settings of the information processing apparatus are changed from settings based on a second group of set values corresponding to an already selected second environment to settings based on a first group of set values corresponding to a first environment newly selected in the selection.

3. The information processing apparatus according to claim 2, wherein
the plurality of different environments are three or more different environments, and
the second notification unit is configured to
when the settings of the information processing apparatus are changed from the settings based on the second group of set values corresponding to the already selected second environment to the settings based on the first group of set values corresponding to the first environment in response to the selection, provide a notification of a first set value as the set value related to the change in use, and
when the settings of the information processing apparatus are changed from settings based on a third group of set values corresponding to an already selected third environment to the settings based on the first group of set values corresponding to the first environment in response to the selection, provide a notification of a second set value as the set value related to the change in use.

4. The information processing apparatus according to claim 1, wherein
the notification provided by the second notification unit is able to be confirmed by a user before the batch setting by the setting unit.

5. The information processing apparatus according to claim 1, wherein
the change in use is a change in whether the function is enabled or disabled.

6. The information processing apparatus according to claim 1, wherein
the notification of the function for which the change in use occurs includes a notification that use of the function is restricted.

7. The information processing apparatus according to claim 1, wherein
the notification of the function for which the change in use occurs includes a notification that a security measure corresponding to the function is relaxed and security of the information processing apparatus is maintained.

8. The information processing apparatus according to claim 1, wherein
a notification of a reason of a change in the set value related to the change in use is provided.

9. The information processing apparatus according to claim 1, further comprising:
a second accepting unit configured to accept from a user, selection of a set value that is set for a setting item whose set value is changed in the batch setting, wherein
the setting unit is configured to perform the batch setting on the basis of the selection of the set value accepted by the second accepting unit from the user.

10. The information processing apparatus according to claim 1, wherein
the information processing apparatus is an image forming apparatus that has a function of scanning and transmitting a document and a function of printing a document, and
the set value included in the notification provided by the second notification unit is a set value with which whether a process performed by any of a plurality of functions of the image forming apparatus is enabled or disabled is able to be changed.

11. The information processing apparatus according to claim 1, wherein the information processing apparatus is an image forming apparatus that has a print job history display function and a suspended-print-job automatic deletion function, the first notification unit is configured to, when a change in use of at least one function of the print job history display function or the suspended-print-job automatic deletion function occurs, provide a notification of the at least one function as the function for which the change in use occurs, and the second notification unit is configured to extract a set value related to the at least one function from the group of set values as the set value related to the change in use and provide a notification of the set value.

12. A control method for an information processing apparatus having a plurality of functions, the control method comprising:

an accepting step of accepting selection of one environment from among a plurality of different environments as a use environment of the information processing apparatus;

a first notification step of providing a notification of a function which is at least one of the plurality of functions and for which a change in use occurs when a group of set values corresponding to the selected one environment is set in the information processing apparatus;

a second notification step of extracting a set value related to the change in use from the group of set values and providing a notification of the set value; and a setting step of performing batch setting for the information processing apparatus on the basis of the group of set values in response to an instruction for setting the group of set values.

13. A non-transitory computer-readable storage medium storing a computer program performing a control method for a printing apparatus including a storage unit, the control method being a control method for an information processing apparatus having a plurality of functions, the control method comprising:

an accepting step of accepting selection of one environment from among a plurality of different environments as a use environment of the information processing apparatus;

a first notification step of providing a notification of a function which is at least one of the plurality of functions and for which a change in use occurs when a group of set values corresponding to the selected one environment is set in the information processing apparatus;

a second notification step of extracting a set value related to the change in use from the group of set values and providing a notification of the set value; and a setting step of performing batch setting for the information processing apparatus on the basis of the group of set values in response to an instruction for setting the group of set values.

* * * * *